United States Patent
Mine et al.

(10) Patent No.: US 6,647,667 B2
(45) Date of Patent: Nov. 18, 2003

(54) TRIM AND SEAL MEMBER

(75) Inventors: Kiminori Mine, Nishikasugai-gun (JP);
Kazuo Ogawa, Nishikasugai-gun (JP);
Keizo Hayashi, Nishikasugai-gun (JP)

(73) Assignee: Toyoda Gosei Co., Ltd., Aichi-ken (JP)

( * ) Notice: Subject to any disclaimer, the term of this patent is extended or adjusted under 35 U.S.C. 154(b) by 0 days.

(21) Appl. No.: 09/801,819

(22) Filed: Mar. 9, 2001

(65) Prior Publication Data

US 2001/0027622 A1 Oct. 11, 2001

(30) Foreign Application Priority Data

Mar. 31, 2000 (JP) .................................... P. 2000-096725
Mar. 31, 2000 (JP) .................................... P. 2000-097657
Mar. 31, 2000 (JP) .................................... P. 2000-097658

(51) Int. Cl.$^7$ ................................................ E06B 7/16
(52) U.S. Cl. ....................................................... 49/490.1
(58) Field of Search ........................... 49/475.1, 490.1, 49/498.1

(56) References Cited

U.S. PATENT DOCUMENTS

| | | | | |
|---|---|---|---|---|
| 4,114,320 A | * | 9/1978 | Pullan ........................ 49/490.1 |
| 4,787,668 A | * | 11/1988 | Kawase et al. ............. 49/490.1 |
| 4,861,530 A | | 8/1989 | Zaccaria ..................... 264/40.2 |
| 4,869,945 A | * | 9/1989 | Harney ....................... 49/490.1 |
| 4,918,867 A | | 4/1990 | Hayashi et al. ............... 49/490 |
| 5,085,006 A | | 2/1992 | Hayashi et al. ............... 49/482 |
| 5,099,612 A | | 3/1992 | Hayashi et al. ............... 49/479 |
| 5,240,664 A | | 8/1993 | Hayashi et al. ............. 264/167 |
| 5,447,670 A | | 9/1995 | Ito et al. ..................... 264/146 |
| 5,679,303 A | | 10/1997 | Hayashi et al. ............. 264/167 |
| 5,693,419 A | | 12/1997 | Nozaki ........................ 428/354 |
| 5,797,644 A | | 8/1998 | Hamabata ................. 296/146.9 |
| 5,958,318 A | | 9/1999 | Hayashi ..................... 264/167 |

FOREIGN PATENT DOCUMENTS

| | | | | |
|---|---|---|---|---|
| GB | 2 133 823 A | | 8/1984 | |
| JP | 363297138 | * | 12/1988 | ................ 49/490.1 |
| JP | A 10 6379 | | 1/1998 | |

* cited by examiner

Primary Examiner—Jerry Redman
(74) Attorney, Agent, or Firm—Posz & Bethards, PLC

(57) ABSTRACT

The present invention relates to a trim or a seal member such as an opening trim weather strip. The trim or a trim body in the seal member has a holding lip portion and modified holding lip portions. And the holding lip portion and modified holding lip portions have head portions. The head portions are made to bulge out toward a bottom wall portion at the tip ends of modified holding lip portions of the trim or the trim body of trim portion. The modified holding lip portions are formed so that projecting lengths of the head portions from the end surfaces of tip end portions of the modified holding lip portions, and the thicknesses of the head portions increase in inverse proportion to lip projecting lengths of the modified holding lip portions from an inner surface of an interior side wall portion. Alternatively, a slope inclined with respect to an extension plane of an opening-portion-side surface of a base end portion is formed at tip ends of the modified holding lip portions. The slope is formed so that the inclination angle with respect to the extension plane increases in accordance with the projecting lengths of the modified holding lip portions.

14 Claims, 12 Drawing Sheets

TRIM AND SEAL MEMBER

BACKGROUND OF THE INVENTION

1. Field of the Invention

The present invention relates to a trim for use in a seal member such as a weather strip of a vehicle or the like, or for use in a decorative part, a covering part for a flange in a vehicle body panel, or the like; and relates to a seal member including such a trim.

The present application is based on Japanese Patent Applications Nos. 2000-96725, 2000-97657 and 2000-97658, which are incorporated herein by reference.

2. Description of the Related Art

As such a trim of this kind, for example, there is known a trim in which a trim body 101 is formed of a polymeric material such as rubber, resin into a substantially U-shape in section and an elongated shape in size, as shown in FIG. 19. A metal insert member 102 is embedded in the trim body 101. In addition, a holding lip 105 is provided to project on an inner surface 103 of a car-interior-side (hereinafter, simply referred to as "interior) side wall of the trim body 101 so as to extend in the longitudinal direction of the trim body 101 while extending toward a bottom wall portion 104 of the trim body 101. A plurality of holding protrusions 107 extending in the longitudinal direction of the trim body 101 is provided to project on an inner surface 106 of a car-exterior-side (hereinafter, simply referred to as "exterior) side wall of the trim body 101 opposite to the inner surface 103.

When the trim body 101 is attached onto a flange 108 of a vehicle body panel of an opening portion of a vehicle or the like, the flange 108 is inserted between the holding lip 105 and the holding protrusions 107. As a result, the holding lip 105 is elastically deformed so that the flange 108 is held between the holding lip 105 and the holding protrusions 107.

On the other hand, as such a seal member including the trim body 101, there is known an opening trim weather strip 110 (hereinafter referred to as "weather strip" simply) as shown in FIG. 19. That is, a trim portion 111 constituted by the trim body 101 in the above-mentioned conventional configuration is provided, and a hollow seal portion 113 composed of, for example, sponge rubber or the like, is formed on an outer surface 112 of the exterior side wall of the trim portion 111.

This weather strip 110 is attached to the flange 108 of an opening portion of a vehicle or the like through the trim portion 111 thereof. Then, the above-mentioned seal portion 113 comes into pressure contact against a door 114 for opening and closing of the opening portion while the door 114 being closed so that the seal portion 113 can be deformed elastically. Thus, the interior and exterior sides of the cabin of the vehicle are sealed off while the door 114 is closed.

However, in the flange 108 of the opening portion, the number of steel plates superimposed on one another varies in accordance with positions so that the thickness of the flange portion 108 has a large variation between positions. Therefore, the lapping quantity between the flange 108 and the holding lip 105 becomes excessive in the portion where the flange 108 is thick. Thus, the insertion load at the trim portion 111 of the weather strip 110 on the flange 108 increases so large that it may become difficult to attach the weather strip 110.

To solve such a problem, in the weather strip 110 in the first conventional configuration, as shown by the two-dot chain line in FIG. 19, the portion of the holding lip 105 corresponding to the thick portion of the flange 108 is shortened by cutting off the holding lip 105 in accordance with the thickness of the flange 108 so that the insertion load is lowered. However, in the weather strip 110 in this conventional configuration, the step of cutting off the holding lip 105 is required. In addition, attachment has to be carried out while seeking out a portion to be cut off and positioning the holding lip 105. Thus, there has been a problem that it takes much time to attach the weather strip 110.

On the other hand, for example, British Patent No. GB 2,133,823 discloses a configuration in which the projecting length of the holding lip 105 from the inner surface 103 is varied in the longitudinal direction of the weather strip 110 when the weather strip 110 is extruded.

However, in this conventional configuration, it is inevitable that the rigidity in a base end portion 115 of a modified holding lip portion 105a which is the shortest section having the shortest projecting length increases due to the ratio of the projecting length to the thickness of the modified holding lip portion 105a. Thus, when the flange 108 is inserted, the modified holding lip portion 105a of the shortest section is elastically deformed solely in a tip end portion 116 thereof. As a result, freedom to set the insertion load and the pull-out load on the flange 108 is reduced in the modified holding lip portion 105a of the shortest section. In this second conventional configuration, therefore, there has been a problem that the yield of products is lowered and the manufacturing cost thereof increases.

Further, in the above British Patent, as shown by the two-dot chain line in FIG. 19, in the modified holding lip portion 105a in the shortest section in which the projecting length is shortest, the length Li' of the modified holding lip portion 105a on the bottom wall portion 104 side of the trim portion 111 and the length Lo' of the modified holding lip portion 105a on the opening portion 115 side of the trim portion 111 satisfy the following expression.

$$Li'/2 < Lo' \leq Li'$$

That is, the modified holding lip portion 105a of the shortest section has a sectional shape of a trapezoid close to a rectangle. Thus, the shorter the length of the modified holding lip portion 105a, the smaller the ratio of the length to the thickness. In such a modified holding lip portion 105a in the shortest section, the rigidity of the modified holding lip portion 105a as a whole increases so that it becomes difficult that the modified holding lip portion 105a is deformed. As a result, in the modified holding lip portion 105a in the shortest section, there has been a problem that the insertion load at the modified holding lip portion 105a is reduced only to little extent in accordance with reduction in the lapping quantity of the modified holding lip portion 105a over the flange 108.

Besides, as shown in FIG. 20, Unexamined Japanese Patent Publication No. Hei. 10-6379 discloses a configuration in which the projecting angle of the whole of the holding lip 105 from an inner surface of an interior side wall portion 117 of the trim portion 111 is varied in the longitudinal direction of the weather strip 110 when the weather strip 110 is extruded. In this conventional configuration, the holding lip 105 is set so that a modified holding lip portion 105b corresponding to a thicker portion of the flange 108 has a larger projecting angle as a whole. To say other words, the holding lip 105 is formed so that the modified holding lip portion 105b corresponding to the thicker portion of the flange 108 projects as a whole in gentler inclination with respect to the interior side wall portion 117. Accordingly, the modified holding lip portion 105b becomes easy to bend in the portion corresponding to the thicker portion of the flange 108 so that the insertion load on the flange 108 can be reduced.

However, when the projecting angle of the holding lip 105 is thus varied as a whole, the modified holding lip portion 105b corresponding to the thicker portion of the flange 108 also projects largely. As a result, there has been a problem that the amount of materials used increases in comparison with the case where the holding lip length is varied, so that the manufacturing cost of products increases. In addition, there has been a problem that the lapping quantity also increases so that the insertion load is not reduced sufficiently.

Besides, the above JP 10-6379 also discloses a configuration in which the lip projecting length or thickness of the holding lip 105 as a whole is varied in the longitudinal direction of the weather strip 110 when the weather strip 110 is extruded. In this conventional configuration, the holding lip 105 is set so that a modified holding lip portion 105a corresponding to a thicker portion of the flange 108 has a smaller lip projecting length as a whole. On the contrary, the holding lip 105 is set so that the modified holding lip portion 105a corresponding to a thicker portion of the flange 108 has a smaller thickness as a whole. Accordingly, the insertion load on the flange 108 can be reduced in the portion corresponding to the thicker portion of the flange 108.

However, particularly when the thickness of the modified holding lip portion 105a is reduced as a whole, there is a fear that the rigidity of the modified holding lip portion 105a as a whole is reduced considerably. If the rigidity of the modified holding lip portion 105a as a whole is reduced considerably thus, there has been a problem that the pull-out load on the flange 108 is also lowered so that the weather strip 110 becomes easy to be detached from the flange 108.

SUMMARY OF THE INVENTION

The present invention was developed in consideration of such problems belonging to the background art. It is an object of the present invention to provide a trim which can be manufactured at low cost and which can prevent the insertion load from increasing and the pull-out load from being lowered; and to provide a seal member with such a trim.

In order to achieve the present invention, according to the first aspect of the invention, there is provided a trim which comprises: a trim body composed of a polymeric material and bent into a substantially U-shape in section; and a lip provided to project on an inner surface of the trim body so that a projecting length of the lip from the inner surface varies in a longitudinal direction of the trim body; wherein a protrusion strip (head portion) bulging out toward a bottom wall portion of the trim body is formed at a tip end of the lip so that a sectional area of the protrusion strip varies in accordance with the projecting length of the lip.

With such a configuration, when the trim body is attached to the subject such as a vehicle body flange, to which the trim is attached, the protrusion strip is elastically deformed along the subject together with the lip. To detach the trim body from the subject, therefore, it is necessary to reverse the protrusion strip. Thus, the pull-out load required for detaching the trim body can be increased. Here, because the protrusion strip bulges out toward the bottom wall portion side of the trim body, the insertion load is hardly increased when the trim body is attached to the subject. That is, the pull-out load can be prevented from being lowered, without increasing the insertion load at the time of attachment.

Particularly, the rigidity of a base end portion of the lip increases as the lip projecting length of the lip is smaller. Accordingly, the operation of the protrusion strip becomes conspicuous. Then, it is not necessary to form, so accurately, the lip in the shortest section where the lip projecting length becomes shortest. Thus, the manufacturing cost is reduced.

According to the first aspect of the invention, the protrusion strip may be formed so that the sectional area of the protrusion strip increases as the projecting length of the lip is smaller.

Here, the more the rigidity of the base end portion of the lip increases, the smaller the lip projecting length of the lip becomes. However, with the above configuration, the pull-out load can be more effectively prevented from being lowered, without increasing the insertion load at the time of attachment.

In the above configuration, the protrusion strip may be formed so that at least one of the length of the protrusion strip and the thickness of the protrusion strip on the inner surface side increases as the projecting length of the lip from the inner surface is smaller.

With such a configuration, the operations of the present invention can be attained in a simple structure.

According to the first aspect of the invention, the lip may be formed so that the length Li of the lip on the bottom wall portion side of the trim body and the length Lo of the lip on the opening portion side of the trim body satisfy a relation of the following expression in a shortest section where a projecting length of the lip becomes shortest:

$$0 \leq Lo \leq Li/2 \tag{1}$$

With such a configuration, the length Lo of the lip on the opening portion side can be set to be small in the shortest section while the predetermined length Li of the lip on the bottom wall portion side is ensured. Accordingly, a flexible portion which forms a substantially triangular shape in section and which is elastically deformable along the subject when the trim body is attached to the subject is provided on the tip end side of the lip in the base end portion of the lip of the shortest section. As a result, the rigidity of the base end portion of the lip in the shortest section can be reduced moderately. Thus, the insertion load can be effectively prevented from increasing when the trim body is attached to the subject. In addition, a predetermined lapping quantity is ensured between the lip and the subject to which the trim is attached and between the protrusion strip and the subject, so that the pull-out load can be effectively prevented from being lowered.

Further, there is provided a seal member which comprises: a trim portion disposed in a flange portion of an opening portion of a body of a vehicle corresponding to an opening and closing door of the vehicle so as to hold the flange portion; and a seal portion which can be elastically deformed by pressure contact of the seal portion against the door; wherein the trim portion is constituted by a trim according to the first aspect of the invention.

The operations of the invention can be attained in a seal member attached to a vehicle for sealing off the interior and exterior sides of the cabin of the vehicle or the like. For example, the pull-out load can be prevented from being lowered without increasing the insertion load when the trim portion is attached to the flange.

Further, according to the second aspect of the invention, there is provided a trim which comprises: a trim body composed of a polymeric material and bent into a substantially U-shape in section; and a lip provided to project on an inner surface of the trim body so that a projecting length of the lip from the inner surface varies in a longitudinal direction of the trim body; wherein the lip is formed so that the above relationship (1) is satisfied between the length Li of the lip on the bottom wall portion side of the trim body and the length Lo of the lip on the opening portion side of the trim body in a shortest section in which the projecting length of the lip becomes shortest.

With such a configuration, in the shortest section, the length Lo of the lip portion on the opening portion side can be set to be small while the predetermined length Li of the lip portion on the bottom wall portion side is ensured. Accordingly, a flexible portion which has a substantially triangular shape in section and which is elastically deformable along the subject when the trim body is attached to the subject can be provided on the tip end side of the lip portion in the shortest section. Thus, when the trim body is attached to the subject, due to the presence of the flexible portion, the insertion load can be prevented from exceeding a predetermined value, and a predetermined lapping quantity can be ensured between the lip and the subject.

According to the second aspect, the lip may be formed so that a sectional shape of the lip in the shortest section is substantially triangular.

With such a configuration, in the lip portion of the shortest section, the length Lo of the lip portion on the opening portion side can be set to be further smaller. As a result, the whole of the lip portion in the shortest section is formed as a flexible portion having a good flexibility. Thus, when the trim body is attached to the subject, the insertion load can be prevented easily from exceeding a predetermined value, while a predetermined lapping quantity is ensured between the lip and the subject.

According to the second aspect, an insert member for reinforcing the trim body may be embedded in the trim body.

Such a trim body provided with the insert member embedded therein is so rich in rigidity that the insertion load with which the trim body is pushed is transmitted surely. Thus, it is easy to perform the work of insertion. However, force applied to the lip is apt to increase at the same time. Therefore, the configuration according to the second aspect may be adopted in the trim body. Thus, the insertion load given to the lip can be reduced effectively.

According to the second aspect, a protrusion strip (head portion) is provided at a tip end of the lip so as to bulge out toward the bottom wall portion side of the trim body.

With such a configuration, when the trim body is attached to the subject, the protrusion strip is elastically deformed together with the lip along the subject. To detach the trim body from the subject, therefore, it is necessary to reverse the protrusion strip. Thus, the pull-out load required for detaching the trim body can be increased. Here, the protrusion strip bulges out toward the bottom wall portion side of the trim body. Accordingly, the insertion load is hardly increased when the trim body is to be attached to the subject. That is, the pull-out load can be increased without increasing the insertion load at the time of attachment.

Further, there is provided a seal member which comprises: a trim portion disposed in a flange portion of an opening portion of a body of a vehicle corresponding to an opening and closing door of the vehicle so as to hold the flange portion; and a seal portion which can be elastically deformed by pressure contact of the seal portion against the door; wherein the trim portion is constituted by a trim according to the second aspect of the present invention.

The operations according to the second aspect can be attained in the seal member attached to the vehicle for sealing off the interior and exterior sides of the cabin of the vehicle or the like. For example, the insertion load is prevented from exceeding a predetermined value when the trim portion is attached to the flange.

Still further, according to the third aspect of the invention, there is provided a trim which comprises: a trim body composed of a polymeric material and bent into a substantially U-shape in section; and a lip provided to project on an inner surface of the trim body so that a projecting length of the lip from the inner surface varies in a longitudinal direction of the trim body; wherein a slope is provided at a tip end of the lip so as to be inclined with respect to an extension plane of an opening-portion-side surface in a base end portion of the lip, and the slope is formed so that an inclination angle of the slope with respect to the extension plane of the opening-portion-side surface varies in accordance with the projecting length of the lip.

Here, by adjusting the inclination angle of the slope at the lip tip end with respect to the extension plane of the opening-portion-side surface, the lapping quantity of the lip over the subject to which the trim is attached can be adjusted easily. Then, the lapping quantity is adjusted in accordance with the rigidity of the base end portion of the lip varying in accordance with the projecting length of the lip. Thus, even if the projecting length of the lip varies, the insertion load and the pull-out load on the subject to which the trim is attached can be adjusted to be in a predetermined range. As a result, the insertion load on a thick portion of the subject to which the trim is attached can be prevented from increasing, with a simple configuration and without increasing the amount of materials used.

The slope may be formed so that the inclination angle increases in accordance with the projecting length of the lip.

With such a configuration, the inclination angle of the slope with respect to the extension plane of the base end portion becomes small in the lip which has a small projecting length and in which the rigidity of the base end portion is apt to increase. As a result, the tip end portion of the lip becomes acuter so that the sectional area of the lip near the tip end portion can be set to be smaller. Thus, the flexibility near the tip end portion can be increased so that the insertion load on the subject to which the trim is attached can be prevented from increasing even in the lip having a small projecting length.

On the other hand, in the lip which has a large projecting length and in which the rigidity of the base end portion is apt to be lowered, the inclination angle of the slope with respect to the extension plane of the base end portion becomes large. As a result, the tip end portion of the lip makes an angle close to a right angle so that the sectional area of the lip near the tip end portion can be set to be larger. Thus, the lapping quantity over the subject to which the trim is attached can be increased near the tip end portion so that the pull-out load on the subject to which the trim is attached can be prevented from being lowered.

According to the third aspect, when the lip is formed in a shortest section having a shortest projecting length, the above relationship (1) may be satisfied between the length Li of the lip on the bottom wall portion side of the trim body and the length Lo of the lip on the opening portion side of the trim body.

With such a configuration, the length Lo of the lip of the shortest section on the opening portion side can be set to be small while the predetermined length Li of the lip is ensured on the bottom wall portion side. Accordingly, in the base end portion of the lip of the shortest section in which the rigidity is apt to increase, a flexible portion which has a substantially triangular shape in section and which is elastically deformable along the subject to which the trim is attached is ensured on the tip end side of the lip. As a result, the rigidity of the base end portion of the lip can be reduced more surely and more moderately. Thus, the insertion load in the lip of the shortest section can be effectively prevented from increasing. In addition, a predetermined lapping quantity is ensured between the lip and the subject to which the trim is attached, so that the pull-out load can be effectively prevented from being lowered.

According to the third aspect, the protrusion strip may be provided at a tip end of the lip so as to bulge out toward a bottom wall portion of the trim body.

With such a configuration, when the trim body is attached to the subject to which the trim is attached, the protrusion strip is elastically deformed together with the lip along the subject. To detach the trim body from the subject, therefore, it is necessary to reverse the protrusion strip. Thus, the pull-out load required for detaching the trim body can be increased. Here, because the protrusion strip bulges out toward the bottom wall portion side of the trim body, the insertion load is hardly increased when the trim body is attached to the subject. That is, the pull-out load can be further prevented from being lowered, without increasing the insertion load at the time of attachment.

Still further, there is provided a seal member which comprises: a trim portion disposed in a flange portion of an opening portion of a body of a vehicle corresponding to an opening and closing door of the vehicle; and a seal portion which can be elastically deformed by pressure contact of the seal portion against the door; wherein the trim portion is constituted by a trim according to the third aspect.

The operations of the third aspect, for example, prevention of the insertion load at the trim portion from increasing when the trim portion is attached to a thick subject, can be attained in the seal member attached to the vehicle for sealing off the interior and exterior sides of the cabin of the vehicle or the like.

Features and advantages of the invention will be evident from the following detailed description of the preferred embodiments described in conjunction with the attached drawings.

DETAILED DESCRIPTION OF THE PREFERRED EMBODIMENTS

Figure 1:
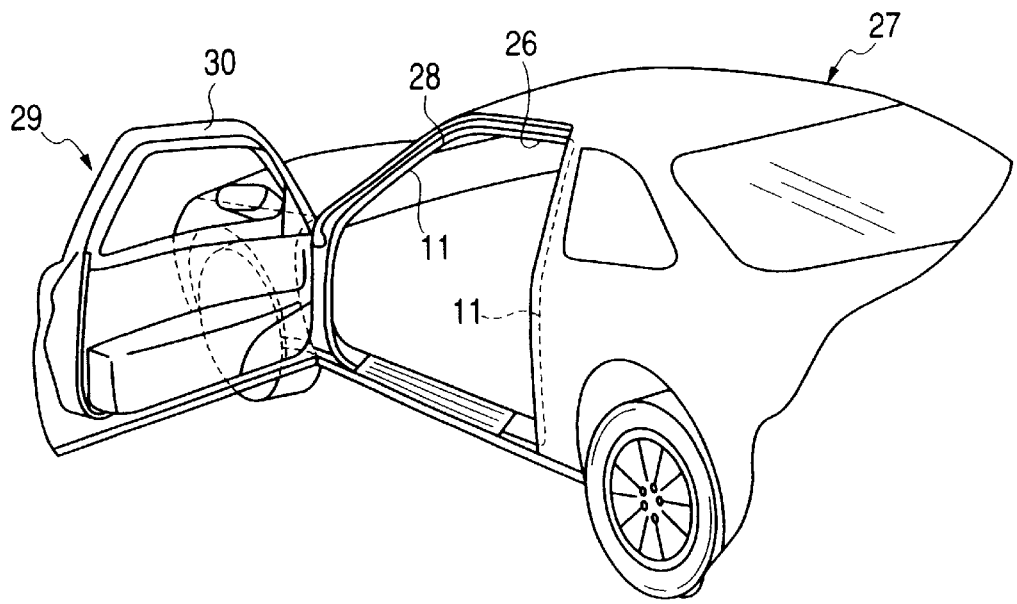
FIG. 1 shows a perspective view showing the state where a weather strip according to any embodiment of the present invention has been attached to a vehicle.
Figure 2:
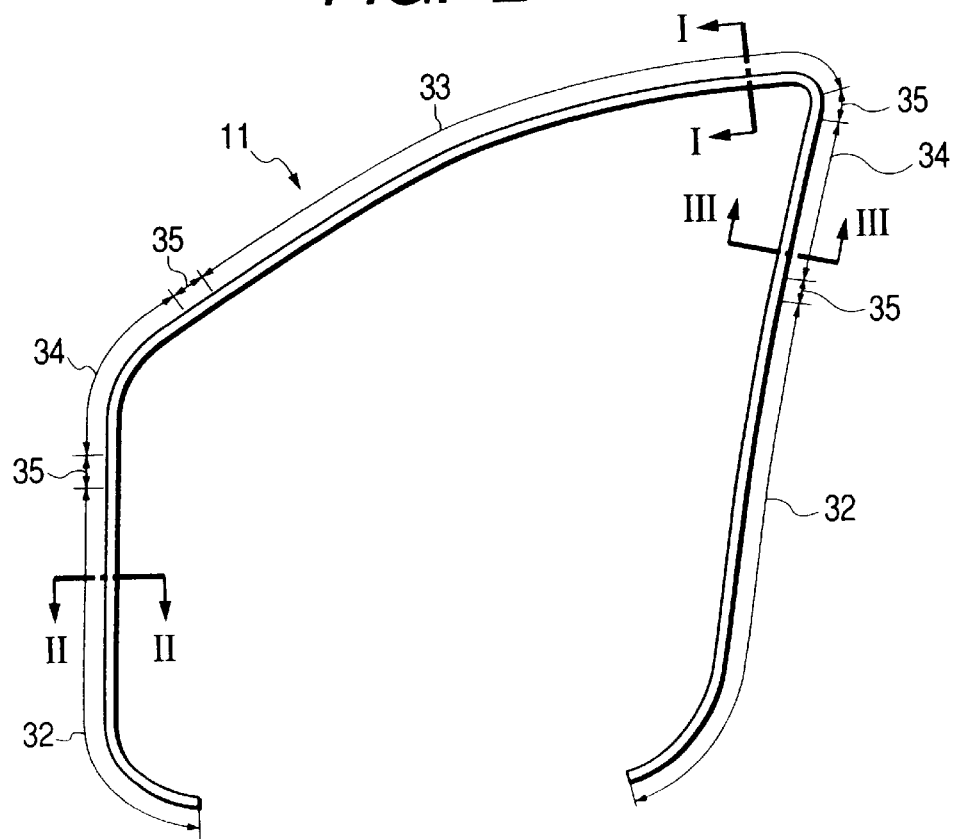
FIG. 2 shows a plan view of a weather strip according to the present invention.

Description will be made below about a first embodiment for carrying out the present invention in the form of a weather strip (opening trim weather strip) to be attached to a circumferential flange portion of a side-door opening portion in a vehicle, with reference to FIGS. 1 to 9.

As shown in FIGS. 1 to 3, 5 and 6, a weather strip 11 as a seal member is provided with a trim body 12 as a trim portion, and a hollow seal portion 13. The trim body 12 is, for example, made of EPDM (ethylene-propylene-diene terpolymer) solid rubber and having a substantially U-shape in section. The hollow seal portion 13 is made of EPDM sponge rubber. The weather strip 11 is produced to be in an elongated shape.

A metal insert member 14 for reinforcing the trim body 12 is embedded in the trim body 12. In order to make the trim body 12 flexible two-dimensionally or three-dimensionally, the insert member 14 has a flexible configuration in which a plurality of rib pieces are embedded as they are, or the rib pieces are embedded in a state that they are connected with each other through narrow bridge portions.

In addition, on an inner surface 16 of an interior side wall portion 15 in the trim body 12, a holding lip 18 is provided to project as a lip extending not only in the longitudinal direction of the trim body 12 but also toward a bottom wall portion 17 of the trim body 12. At the tip end portion of the holding lip 18, a head portion 19 (19a, 19b, 19c) is provided as a protrusion strip extending not only in the longitudinal direction of the trim body 12 but also toward the bottom wall portion 17 of the trim body 12.

On the other hand, a plurality of holding protrusions 22 extending in the longitudinal direction of the trim body 12 are provided to project on an inner surface 21 of an exterior side wall portion 20. In addition, the above-mentioned seal portion 13 is formed integrally on an outer surface 23 of the exterior side wall portion 20. Here, when the trim body 12 is attached to a flange 28 of a vehicle body panel 27 forming an edge portion of the side-door opening portion 26 as an opening portion of the vehicle body in the vehicle, and then a side door 29 as an opening and closing door is closed, the seal portion 13 comes into elastic contact with an outer circumferential portion of the side door 29 (a door frame 30). Thus, the interior and exterior sides of the cabin of the vehicle are sealed off in the state where the side door 29 is closed.

Now, in this embodiment, the weather strip 11 is sectioned into three portions in its longitudinal direction on the basis of the projecting length of the above-mentioned holding lip 18 from the inner surface 16 of the interior side wall portion 15. That is, the weather strip 11 is sectioned into a longest section 32 where the projecting length of the holding lip 18 is the largest (in this section, the holding lip 18 is designated by 18a as shown by the dotted line in FIG. 3 and FIG. 5), a medium section 33 formed so that the projecting length of the holding lip 18 is substantially middle (in this section, the holding lip 18 is designated by 18b as shown by the real line in FIG. 3), and a shortest section 34 where the projecting length is the shortest (in this section, the holding lip 18 is designated by 18c as shown by the one-dot chain line in FIG. 3 and FIG. 6). Generally, the holding lip 18 is formed with the portion 18b of the middle length as a reference of the projecting length. Therefore, change of the length is represented by "modified", and each of the holding lips which are changed in length is referred with "modified holding lip portion" 18a to 18c. The weather strip 11 is sectioned into respective portions 32 to 34 continuously through gradually transitional sections 35. In each of the gradually transitional sections 35, the holding lip 18 is sectioned into the modified holding lip portions 18a to 18c so that the projecting length of the holding lip 18 varies gradually as the section of the weather strip 11 varies from 32 and 34.

The projecting lengths of the modified holding lip portions 18a to 18c in the respective sections 32 to 34 are set in accordance with the whole thickness of the flange 28 opposite to the modified holding lip portions 18a to 18c in the state where the weather strip 11 is attached to the flange 28 of the vehicle body panel 27, as shown in FIGS. 3 to 6. Here, the thickness of the flange 28 varies in accordance with positions because of the number of steel plates in lamination forming the vehicle body panel 27. The modified holding lip portions 18a to 18c have tip end portions 18d which have substantially the same or equal triangular shape in section, while the base end portions 18e have different lengths respectively. In the modified holding lip portion 18c of the shortest section 34, the tip end portion 18d coincides with the base end portion 18e.

Incidentally, in the weather strip 11 of this embodiment, the modified holding lip portion 18c in the shortest section 34 is formed so that the length Li of the modified holding lip portion 18c on the bottom wall portion 17 side is in a range of from 1 mm to 8 mm, preferably in a range of from 2 mm to 6 mm, more preferably in a range of from 2 mm to 4 mm. On the other hand, the length Lo of the modified holding lip portion 18c on the opening portion 31 side is set to be in a range of from 0 to Li/2 (mm) (above relationship (1)), preferably in a range of from 0 to Li/3 (mm), more preferably in a range of 0 to Li/4 (mm). Thus, also in the modified holding lip portion 18c, a flexible portion which can be elastically deformed along the flange 28 of the vehicle body panel 27 upon insertion of the flange 28 when the weather strip 11 is attached to the flange 28.

Particularly, if the length Lo of the modified holding lip portion 18c on the opening portion 31 side is set to be approximately 0, the sectional shape of the modified holding lip portion 18c becomes substantially triangular. In this case, the modified holding lip portion 18c as a whole is formed as a flexible portion, as shown by the two-dot chain line in FIG. 6.

Next, more detailed description will be made about the shapes of the head portions 19a to 19c of the modified holding lip portions 18a to 18c.

Figure 4:
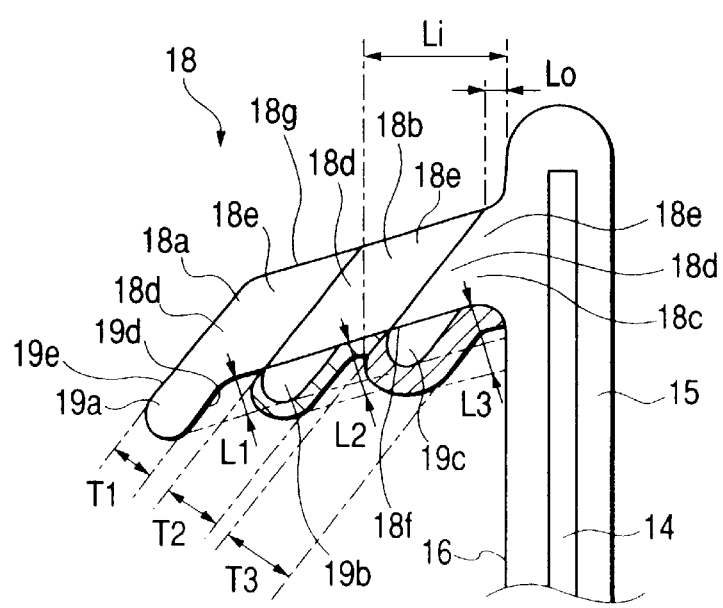
FIG. 4 shows an explanatory view about the shapes of respective holding lip portions shown in FIG. 3.
Figure 5:
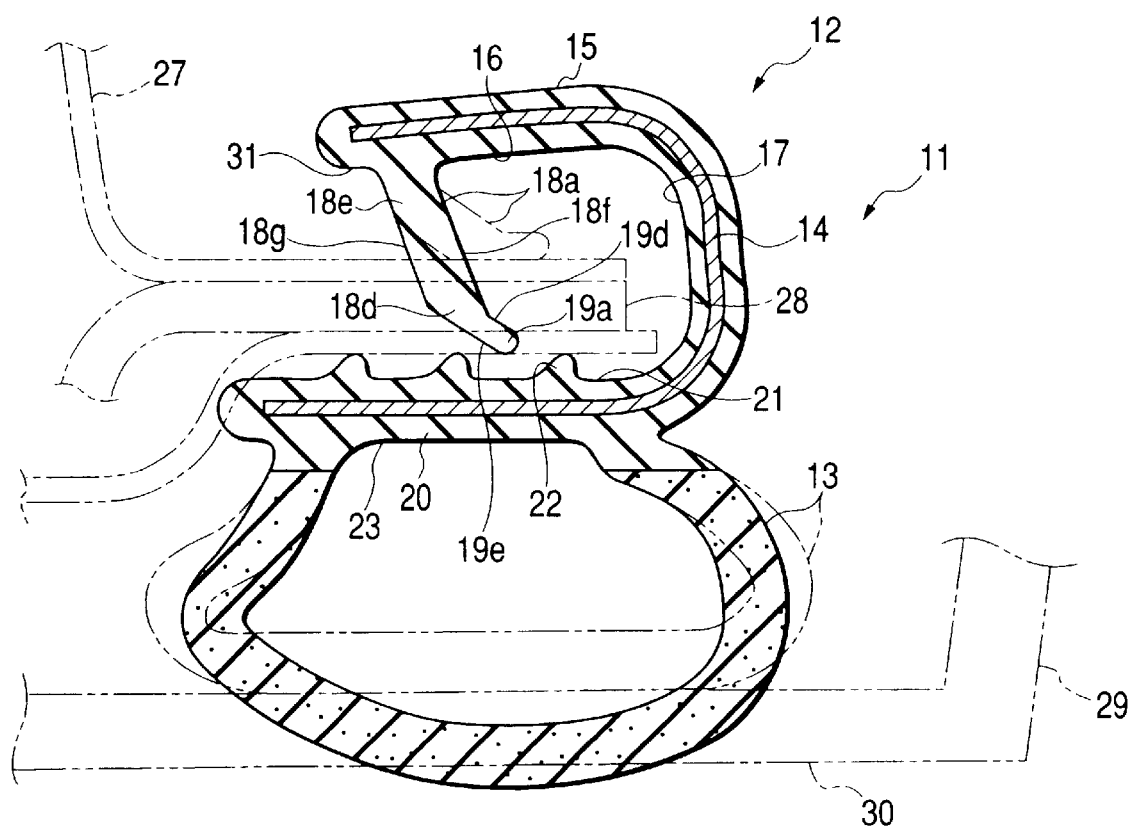
FIG. 5 shows a sectional view taken along line II—II in FIG. 2 in the first embodiment of the weather strip.
Figure 6:
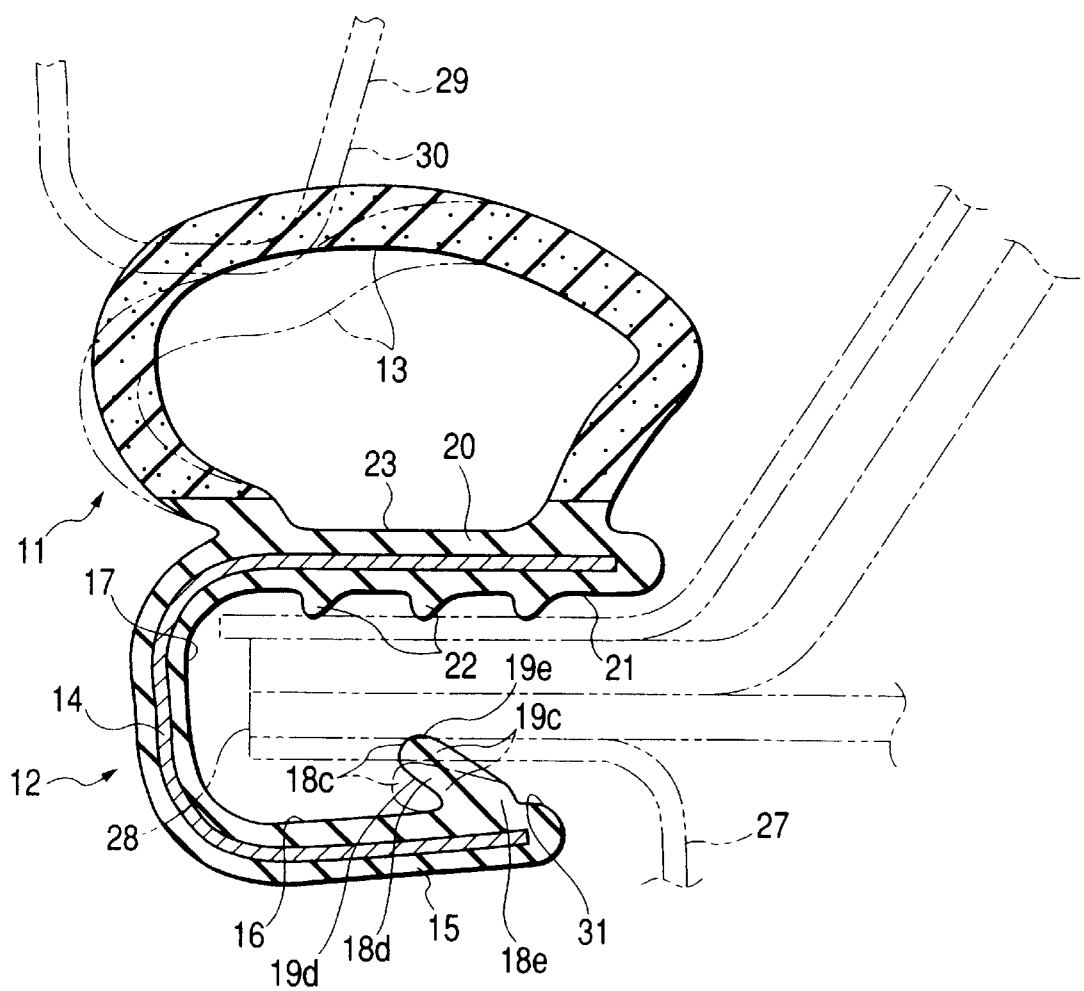
FIG. 6 shows a sectional view taken along line III—III in FIG. 2 in the first embodiment of the weather strip.

As shown in FIG. 4, the sectional areas of the head portions 19a to 19c formed on the tip end portions 18d of the modified holding lip portions 18a to 18c respectively are varied in accordance with the lip projecting lengths of the respective modified holding lip portions 18a to 18c from the inner surface 16 of the interior side wall portion 15. Here, it is assumed that the projecting length of the head 19a from the end surface of the tip end portion 18d (hereinafter referred to as "head-portion projecting length") in the modified holding lip portion 18a of the longest section 32 is L1, and the thickness of the head portion 19a is T1. Similarly, it is assumed that the head-portion projecting length and thickness of the head portion 19b in the modified holding lip portion 18b of the medium section 33, and the head-portion projecting length and the thickness of the head portion 19c in the modified holding lip portion 18c of the shortest section 34 are L2 and T2, and L3 and T3, respectively. These head portions 19a to 19c are formed to satisfy the following expressions (2) and (3) respectively.

$$L1<L2<L3 \quad (2)$$

$$T1<T2<T3 \quad (3)$$

That is, the head-portion projecting lengths L1 to L3 and the thicknesses T1 to T3 of the respective head portions 19a to 19c increase in inverse proportion to the lip projecting lengths of the respective modified holding lip portions 18a to 18c. As a result, the respective head portions 19a to 19c are formed so that the sectional areas thereof are enlarged sequentially in inverse proportion to the lip projecting lengths of the respective modified holding lip portions 18a to 18c. Incidentally, in FIG. 4, the enlarged quantity between the sectional areas of the respective head portions 19a to 19c is illustrated with large exaggeration in order to facilitate understanding.

Here, with reference to the head portion 19a of the modified holding lip portion 18a of the longest section 32, the sectional areas of the head portions 19b and 19c of the modified holding lip portions 18b and 18c of the medium and shortest sections 33 and 34 are enlarged by the shadowed portions in FIG. 4, respectively. Incidentally, in FIG. 4, the enlarged portions of the sectional areas of the respective head portions 19b and 19c are illustrated with exaggeration in order to facilitate understanding. In addition, in the respective modified holding lip portions 18b and 18c, not only their head portions 19b and 19c but also their outer circumferential surfaces are formed to bulge out toward the outside as a whole.

Next, brief description will be made about the method for manufacturing the weather strip 11, mainly made about the method for manufacturing the vicinity of the holding lip 18. Incidentally, since a conventional die used broadly is used for portions other than the holding lip 18, description of the conventional die will be omitted.

A die having an opening for forming the trim body 12 and an opening for forming the seal portion 13 respectively is attached to an extruder. Then, the opening for forming the trim body 12 is supplied with unvulcanized EPDM solid rubber together with the long-size insert member 14. On the other hand, the opening for forming the seal portion 13 is supplied with unvulcanized EPDM sponge rubber. Then, the EPDM solid rubber and the EPDM sponge rubber are extruded from the died and are shaped into predetermined sectional shape integrally. And it is vulcanized on a predetermined temperature through the vulcanizer condition so as to form an extruded weather strip member continuously. The extruded weather strip 11 member thus is cutoff into a predetermined length. Thus, one weather strip 11 is formed out.

Figure 7:
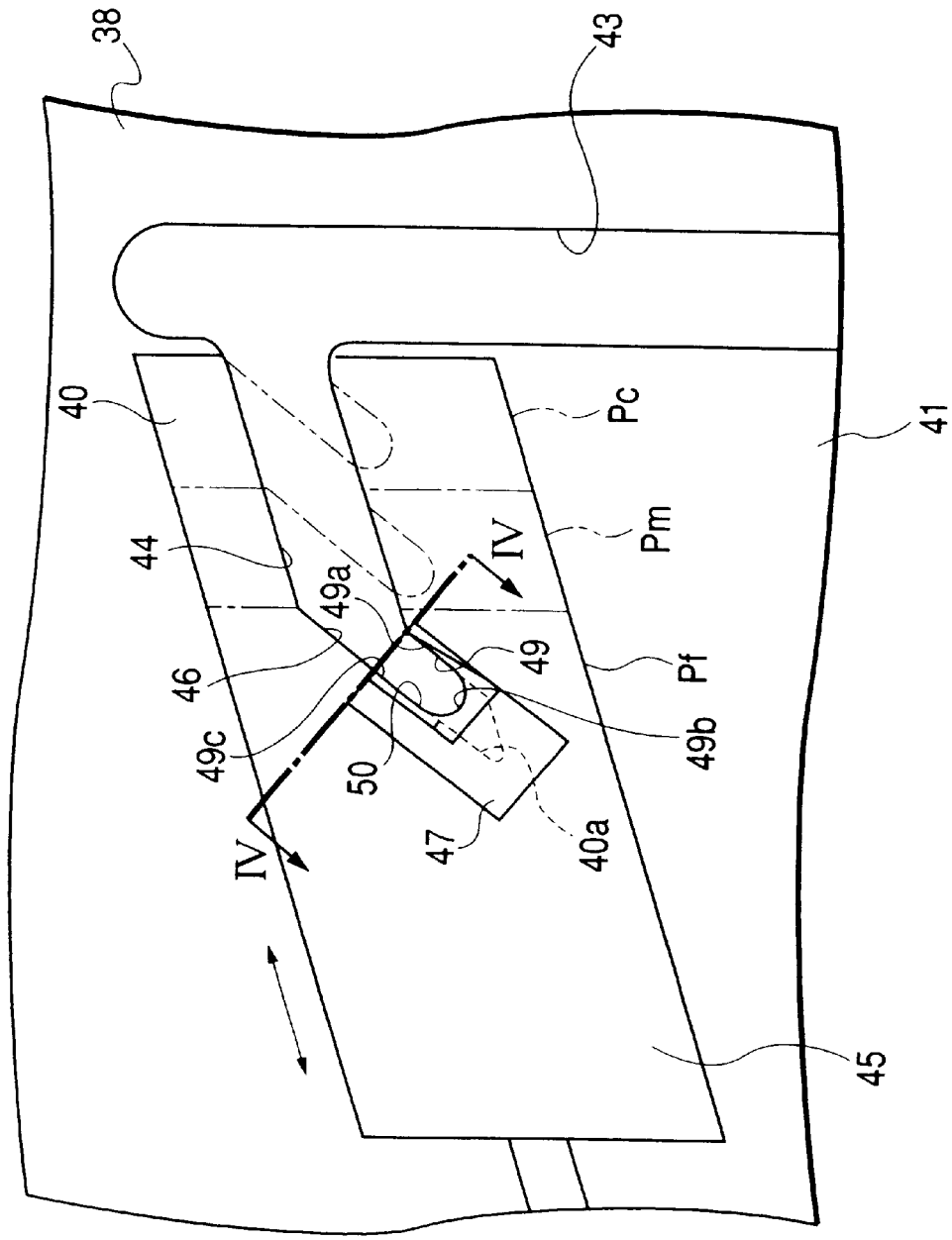
FIG. 7 shows an enlarged partial view of a main portion of a die for extruding the modified holding lip portions shown in FIGS. 3 to 6.

Here, in the weather strip 11 of this embodiment, the projecting length of the holding lip 18 is variously varied in the longitudinal direction of the weather strip 11. In a die 38 for varying the projecting length of the holding lip 18, a first plate 40, a second plate 41, a cover plate 42 are superimposed on one another in the order of increasing distance from an extruder 39 as shown in FIG. 7. In the first plate 40, there are formed a side-wall-portion opening 43 for forming the opposite side wall portions 15 and 20 of the trim body 12, a base-end-portion opening 44 for forming the base end portion 18e correspondingly to the modified holding lip portion 18a of the longest section 32, and a tip-end-portion opening 40a for forming the tip end portion 18d including its head portion 19, respectively.

On the other hand, in the second plate 41, there is a slide core 45 for sliding in the extension direction (indicated by the bidirectional arrow in FIG. 7) of the holding lip 18. In this slide core 45, there are formed a tip-end-portion opening 46 for forming the tip end portion 18d of the holding lip 18, and a head portion forming block 47 for forming the head portion 19.

Figure 8:
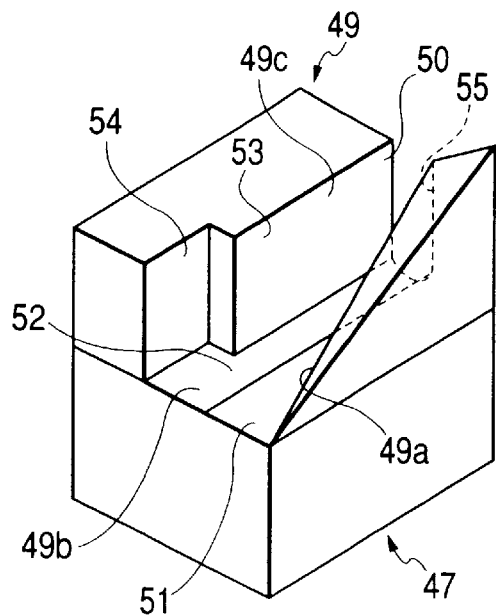
FIG. 8 shows an enlarged perspective view of a head portion forming block in FIG. 7.
Figure 9:
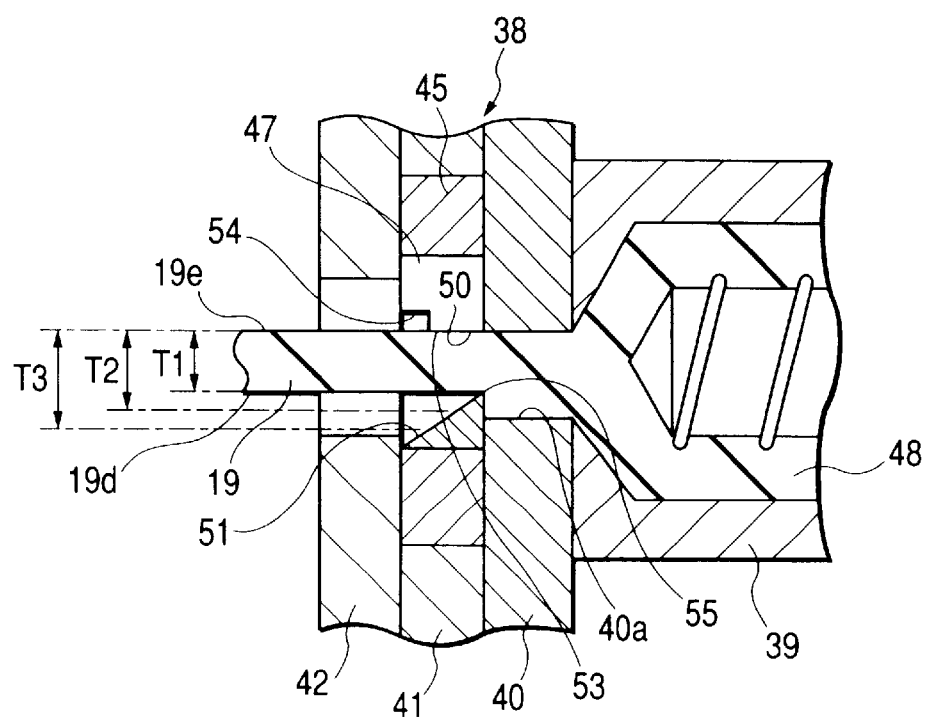
FIG. 9 shows a sectional view taken along line IV—IV in FIG. 7.

As shown in FIGS. 7 to 9, this head portion forming block 47 has a substantially rectangular shape as a whole, and a groove portion 49 for allowing unvulcanized rubber 48 to circulate is grooved in one end surface of the head-portion forming block 47. A head-portion opening 50 is opened into a sectionally U-shape at an upstream-side end of the groove portion 49 (on the first plate 40 side). The head-portion forming block 47 is disposed to close a part of the tip-end-portion opening 40a of the first plate 40 while connecting the head-portion opening 50 to the tip-end-portion opening 46 of the second plate 41.

A first by-pass slope 51 is formed in a side surface 49a of the groove portion 49 on the inner surface 18f side of the holding lip 18. In addition, a second by-pass slope 52 is formed in a bottom surface 49b of the groove portion 49. On the other hand, in a side surface 49c of the groove portion 49 on the outer surface 18g side of the holding lip 18, a regulation flat surface 53 is formed to follow an end surface of the tip-end-portion opening 40a of the first plate 40. A step portion 54 is formed on the downstream-side (cover plate 42 side) of the side surface 49c of the groove portion 49 on the outer surface 18g side of the holding lip 18. Thus, by the presence of the first and second by-pass slopes 51 and 52 and the step portion 54, the downstream-side opening area of the groove portion 49 is enlarged in comparison with the upstream-side opening area (the opening area of the head-portion opening 50).

Then, when the lip projecting length of the holding lip 18 is varied, the slide core 45 is slid in the bidirectional-arrow direction of FIG. 7 so as to vary the opening area of the base-end-portion opening 44. That is, when the modified holding lip portion 18a of the longest section 32 is formed, the slide core 45 is disposed in a position Pf farthest from the side-wall-portion opening 43. Thus, the modified holding lip portion 18a is formed so that the tip end portion 18d including the head portion 19a is connected to the long base end portion 18e.

On the other hand, when the modified holding lip portion 18c of the shortest section 34 is formed, the slide core 45 is disposed in a position Pc closest to the side-wall-portion opening 43. Thus, the modified holding lip portion 18c is formed so that the tip end portion 18d and the base end portion 18e are connected to the interior side wall portion 15 in the condition that the tip end portion 18d and the base end portion 18e substantially coincide with each other.

Further, when the modified holding lip portion 18b of the medium section 33 is formed, the slide core 45 is disposed in a position Pm between the above-mentioned two positions Pf and Pc. Thus, the modified holding lip portion 18b is formed so that the tip end portion 18d including the head portion 19b is connected onto the base end portion 18e having the medium length.

Incidentally, the above-mentioned extruder 39 is provided with a mechanism for reducing the fluctuation of extrusion pressure, such as an accumulator or the like. Accordingly, if the slide core 45 is located in the position Pc closest to the side-wall-portion opening 43 (the position for forming the modified holding lip portion 18c of the shortest section 34) when the weather strip 11 is manufactured, the fluctuation of pressure is roughly relaxed while the pressure of the unvulcanized rubber 48 increases slightly in the base-end-portion opening 44, the tip-end-portion opening 46 and the head-portion opening 50.

In this state, when the unvulcanized rubber 48 extruded from the die 38 passes through an edge portion 55 of the die 38 on the inner surface 19d side of the head portion 19, the unvulcanized rubber 48 is shaped to bulge out slightly along the first and second by-pass slopes 51 and 52 so as to relax the above-mentioned slight pressure rise. On the other hand, on the outer surface 19e side of the head portion 19, as described above, the unvulcanized rubber 48 is shaped while being regulated not to bulge out by the regulation flat surface 53 following the end surface of the tip-end-portion opening 40a of the first plate 40. As a result, in the modified holding lip portion 18c of the shortest section 34, the head portion 19 thereof bulges out from its tip end to the inner surface 19d. Thus, projecting length L3 and thickness T3 of the head portion 19 of the modified holding lip portion 18c increase. Incidentally, in FIG. 9, the variation in thickness T1 to T3 of the head portion 19 is illustrated with large exaggeration in order to facilitate understanding.

On the contrary, when the slide core 45 moves to go away from the side-wall-portion opening 43, the pressure of the unvulcanized rubber 48 is reduced in the base-end-portion opening 44, the tip-end-portion opening 46 and the head-portion opening 50. Accordingly, when the slide core 45 is located in the position Pf farthest from the side-wall-portion opening 43 (the position for forming the modified holding lip portion 18a of the longest section 32), the unvulcanized rubber 48 extruded from the die 38 is formed into a shape regulated by the edge portion 55 of the die 38 also on the inner surface 19d side of the head portion 19 when the unvulcanized rubber 48 passes through the edge portion 55 of the die 38. As a result, in the modified holding lip portion 18a of the longest section 32, the head portion 19 of the modified holding lip portion 18a does not bulge out from its tip end to the inner surface 19d. Thus, the projecting length L1 and thickness T1 of the head portion 19 of the modified holding lip portion 18a are reduced. Thus, the lip projecting length of the holding lip 18 is varied and fixed in the condition that the sectional area of the head portion 19 is varied in accordance with the lip projecting length.

Next, description will be made about the operation with which the weather strip 11 configured thus is attached to the flange 28 of the vehicle body panel 27.

Figure 3:
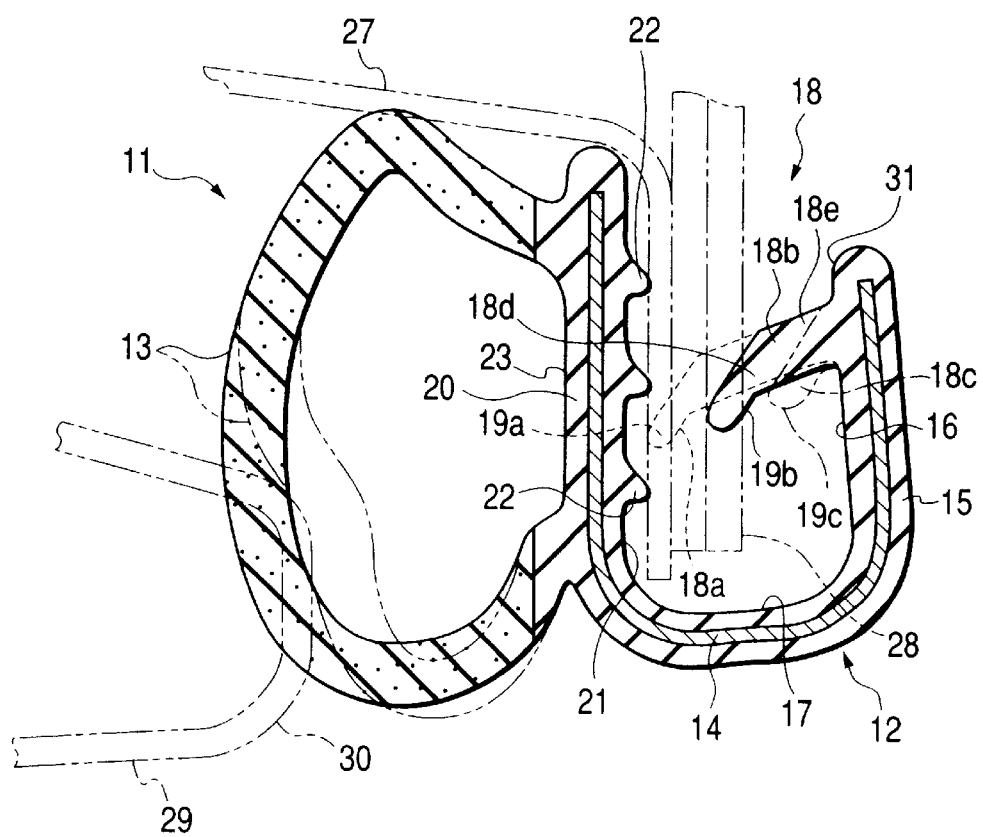
FIG. 3 shows a sectional view taken along line I—I in FIG. 2 in the first embodiment of a weather strip.

As shown in FIGS. 1 and 3, the weather strip 11 is fitted sequentially from a predetermined reference position so that the trim body 12 of the weather strip 11 covers the flange 28. As a result of this fitting operation, the flange 28 is inserted between the holding lip 18 and the holding protrusions 22 so that the holding lip 18 is elastically deformed to run along the flange 28 together with the head portion 19. Then, by the elastic deformation of the holding lip 18 and the head portion 19, the flange 28 is held between the holding lip 18 and the holding protrusions 22.

Thus, according to this embodiment, the following effects can be obtained.

(i) In this weather strip 11, the head portion 19 is provided on the tip end portion 18d of the holding lip 18 so as to bulge out toward the bottom wall portion 17 of the trim body 12. Then, the head portion 19 is formed so that the sectional area thereof varies in accordance with the lip projecting length of the holding lip 18.

As a result, when the trim body 12 is attached to the flange 28, the head portion 19 is elastically deformed along the flange 28 together with the holding lip 18. To detach the trim body 12 from the flange 28, it is necessary to reverse the head portion 19. Then, resistance against the force to detach the trim body 12 is produced by reverse of the head portion 19 so that the pull-out load can be increased.

Here, since the head portion 19 bulges out toward the bottom wall portion 17 of the trim body 12, the insertion load is hardly increased when the trim body 12 is attached to the flange 28. Therefore, if the sectional area of the head portion 19 is adjusted in accordance with the rigidity of the holding lip 18 itself, which varies in accordance with the lip projecting length, it is possible to prevent the pull-out load from being lowered, without increasing the insertion load at the time of attachment of the trim body 12.

(ii) As the lip projecting length of the holding lip 18 is smaller, the rigidity thereof increases on the basis of the ratio between the lip projecting length and the thickness of the base end portion 18e of the holding lip 18. Therefore, there is a fear that the tip end portion 18d of the holding lip 18 is elastically deformed only partially when the flange 28 is inserted into the trim body 12. On the contrary, in this weather strip 11, the head portion 19 bulges out on the tip end portion 18d of the holding lip 18. In addition, the head portion 19 is formed so that the sectional area thereof increases in reverse proportion to the lip projecting length of the holding lip 18 by varying the head portion projecting length and thickness.

Thus, the head-portion projecting length of the head portion 19 is increased as the lip projecting length of the holding lip 18 is smaller. As a result, even in the modified holding lip portion 18c in the shortest section 34, the lapping quantity between the head portion 19 of the modified holding lip portion 18c and the flange 28 is increased. When the trim body 12 is to be detached from the flange 28, the reverse quantity of the head portion 19 increases so that the pull-out load can be prevented from being lowered.

In addition, by increasing the thickness of the head portion 19 as the lip projecting length of the holding lip 18 is smaller, the rigidity of the head portion 19 increases. When the trim body 12 is to be detached from the flange 28, it becomes difficult to reverse the head portion 19. Thus, the pull-out load can be prevented from being lowered.

Thus, the effect of the head portion 19 provided on the tip end portion 18d of the holding lip 18 becomes more conspicuous as the lip projecting length of the holding lip 18 is smaller. Then, the insertion load and the pull-out load at the modified Holding lip portion 18c in the shortest section 34 can be adjusted also by the head portion 19c. Accordingly, it is not necessary to form the modified holding lip portion 18c in the shortest section 34 so accurately. It is therefore possible to reduce the manufacturing cost of the weather strip 11.

(iii) In this weather strip 11, the modified holding lip portion 18c of the shortest section 34 in the trim body 12 is formed so that the length Lo of the modified holding lip portion 18c on the opening portion 31 side is not larger than half the length Li of the modified holding lip portion 18c on the bottom wall portion 17 side.

Accordingly, in the modified holding lip portion 18c of the shortest section 34, the length Lo on the opening portion 31 side can be set to be small while the predetermined length Li is ensured on the bottom wall portion 17 side. Thus, a flexible portion which forms a triangular shape in section and which can be elastically deformed along the flange 28 of the vehicle body panel 27 when the trim body 12 is attached to the flange 28 can be provided on the tip end side of the base end portion 18e in the modified holding lip portion 18c of the shortest section 34.

Thus, when the trim body 12 is attached to the flange 28, because of the presence of the flexible portion, a predetermined lapping quantity is ensured between the modified holding lip portion 18c and the flange 28, and the rigidity is reduced moderately in the modified holding lip portion 18c. As a result, increase in the insertion load and reduction in the pull-out load are prevented. Accordingly, the weather strip 11 can be held on the flange 28 more surely, regardless of the thickness of the flange 28.

(iv) In this weather strip 11, the modified holding lip portion 18c in the shortest section 34 is formed into a substantially triangular shape in section. That is, in the modified holding lip portion 18c of the shortest section 34, the length Lo of the modified holding lip portion 18c on the opening portion 31 side is set to be approximately zero.

Accordingly, the modified holding lip portion 18c of the shortest section 34 as a whole becomes a flexible portion having a good flexibility. As a result, when the trim body 12 is attached to the flange 28, the insertion load at the trim body 12 can be more effectively prevented from increasing. It is therefore possible to further improve the attachment property of the trim body 12 to the flange 28.

Incidentally, the above-mentioned embodiment may be modified as follows.

In the above-mentioned embodiment, the weather strip 11 may be formed while the head-portion forming block 47 is slid left-obliquely downward in FIG. 7. In this case, the head-portion projecting length of the head portion 19 of the holding lip 18 can be varied more correctly.

In the above-mentioned embodiment, the modified holding lip portion 18c in the shortest section 34 may be formed so that the length Li of the modified holding lip portion 18c on the bottom wall portion 17 side and the length Lo of the modified holding lip portion 18c on the opening portion 31 side satisfy the following expression (4) in addition to the forgoing expression (1).

$$Li/2 \leq Lo \leq Li \qquad (4)$$

With such a configuration, the rigidity of the base end portion 18e of the modified holding lip portion 18c in the shortest section 34 increases slightly. However, when the lip projecting length of the modified holding lip portion 18c is set to be slightly small, the insertion load and the pull-out load at the modified holding lip portion 18c on the flange 28 can be set easily by the adjustment of the sectional area of the head portion 19c on the tip end portion 18d of the modified holding lip portion 18c while avoiding the influence of the increase in rigidity of the base end portion 18e of the modified holding lip portion 18c. Thus, the degree of freedom on design increases so that the manufacturing cost of the weather strip 11 can be reduced.

In the above-mentioned embodiment, the head portions 19a to 19c of the respective modified holding lip portions 18a to 18c are formed so that the head-portion projecting lengths L1 to L3 and the thicknesses T1 to T3 are varied simultaneously. Alternatively, they may be formed so that only the head-portion projecting lengths L1 to L3 or only the thicknesses T1 to T3 are varied.

Figure 10:
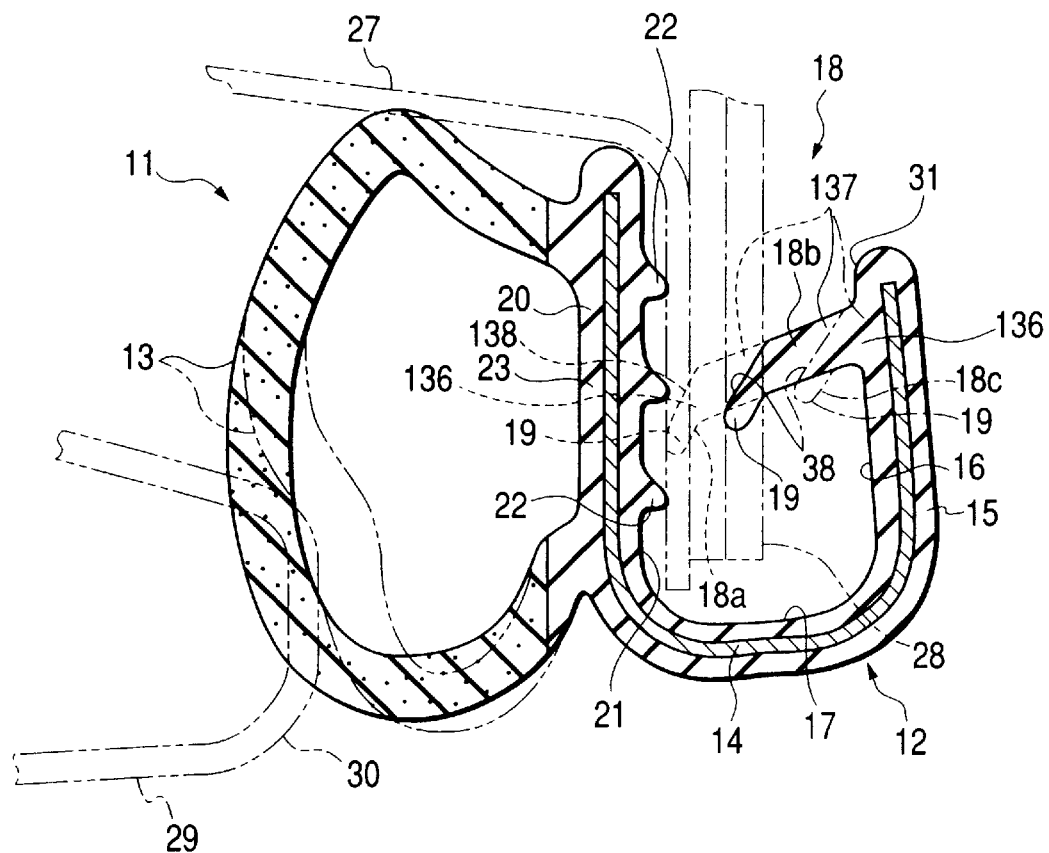
FIG. 10 shows a sectional view taken along line I—I in FIG. 2 in the second embodiment of the weather strip.

Next, description will be made below about a second embodiment for carrying out the present invention with reference to FIGS. 10 to 12. In this embodiment, the head portion 19 is not changed in accordance with the projecting lengths of the holding lip portions 18a to 18c, and has a constant shape over the all holding lip portions 18a to 18c.

Figure 11:
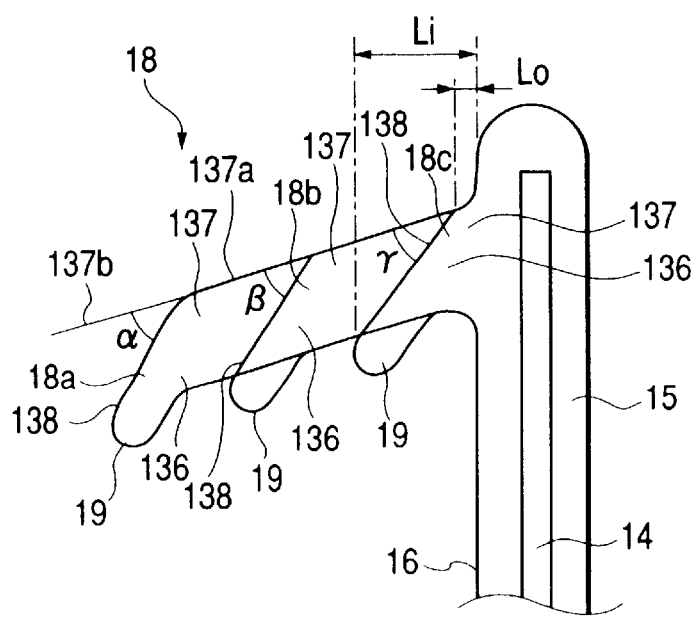
FIG. 11 shows an explanatory view about the shapes of respective holding lip portions shown in FIG. 10.

As shown in FIG. 11, slopes 138 (equivalent to the outer surface 19e in the first embodiment) inclined at predetermined inclination angles with respect to extension planes 137b of opening-portion-side surfaces 137a (equivalent to the outer surface 18g in the first embodiment) of the base end portions 137 (18e in the first embodiment) in the modified holding lip portions 18a to 18c are provided in the tip end portions 136 (18d in the first embodiment) of the modified holding lip portions 18a to 18c respectively. The inclination angles of the slopes 138 are set to be preferably in a range of from 20° to 80°, more preferably in a range of from 30° to 75°, further more preferably in a range of 40° to 60°.

Here, when the inclination angles of the slopes 138 in the modified holding lip portions 18a to 18c of the longest, medium and shortest sections 32 to 34 are α, β and γ respectively, the slopes 138 are formed to satisfy the relation of α>β>γ. To say other words, the slopes 138 are formed so that the inclination angles of the slopes 138 in the modified holding lip portions 18a to 18c increase in accordance with the projecting lengths of the modified holding lip portions 18a to 18c. That is, in the modified holding lip portion 18a having a large projecting length, the slope 138 at the tip end thereof is formed to have an angle close to a right angle with respect to the opening-portion-side surface 137a of the base end portion 137. On the other hand, in the modified holding lip portion 18c having a small projecting length, the slope 138 at the tip end thereof is formed to have a gentler angle with respect to the opening-portion-side surface 137a of the base end portion 137.

Next, brief description will be made about the method for manufacturing the weather strip 11, mainly made about the method for manufacturing the vicinity of the holding lip 18, especially different from the method for manufacturing the first embodiment of the weather strip.

A die having an opening for forming the trim body 12 and an opening for forming the seal portion 13 respectively is attached to an extruder. Then, an extruded weather strip member is continuously extruded according to the same manner for the first embodiment. The extruded weather strip member extruded continuously thus is cut off into a predetermined length. Thus, one weather strip 11 is formed out.

Here, in the weather strip 11 of this embodiment, the projecting length of the holding lip 18 is variously varied in the longitudinal direction of the weather strip 11 similarly to the first embodiment. In a die 141 for varying the projecting length of the holding lip 18, a first plate 142, a second plate 143, a not-shown third plate and a not-shown cover plate are superimposed on one another in the order of increasing distance from a not-shown extruder as shown in FIG. 12. In the first plate 142, there are a side-wall-portion opening 144 for forming the opposite side wall portions 15 and 20 of the trim body 12, and a base-end-portion opening 145 for forming the base end portion 137 correspondingly to the modified holding lip portion 18a of the longest section 32, respectively.

On the other hand, in the second plate 143, there is a first slide core 146 for sliding in the extension direction (indicated by the bidirectional arrow in FIG. 12) of the holding lip 18. In this first slide core 146, there are a tip-end-portion opening 147 for forming the tip end portion 136 of the holding lip 18, and a head-portion opening 148 for forming the head portion 19.

Further, in the third plate, there is a second slide core 149 for varying the inclination angle of the slope 138 of the holding lip 18 in accordance with the projecting length of the holding lip 18. This second slide core 149 slides in the extension direction of the holding lip 18 synchronously with the first slide core 146 while rotating around the vicinity of the intersection point between the base-end-portion opening 145 of the first plate 142 and the tip-end-portion opening 147 of the first slide core 146.

Figure 12:
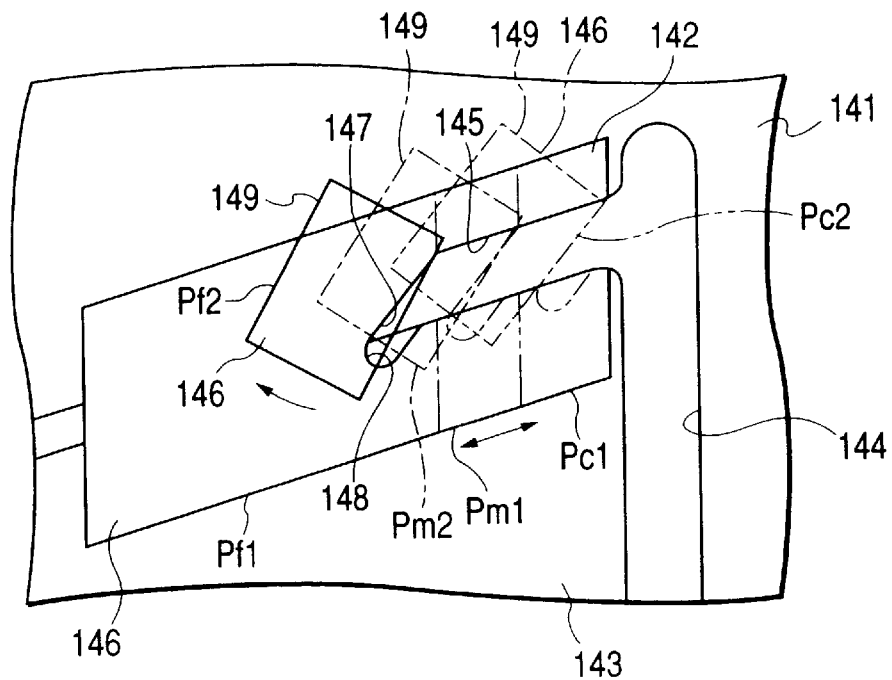
FIG. 12 shows an enlarged partial view of a main portion of a die extruding the modified holding lip portions shown in FIGS. 10 and 11.

Then, when the projecting length of the holding lip 18 is varied, the first slide core 146 is slid in the bidirectional-arrow direction of FIG. 12 so as to vary the opening area of the base-end-portion opening 145. That is, when the modified holding lip portion 18a of the longest section 32 is formed, the first slide core 146 is disposed in a position Pf1 farthest from the side-wall-portion opening 144. At the same time, the second slide core 149 is disposed in a position Pf2 to close the side-wall-portion opening 144 and the head-portion opening 148 of the first slide core 146 partially on the tip end side of the holding lip 18. At this time, the second core 149 is located so that an end surface of the second slide core 149 on the side-wall-portion opening 144 side forms an angle of 180-α° with respect to an end surface of the base-end-portion opening 145 of the first plate 142. In this condition, unvulcanized EPDM solid rubber is extruded so as to form the modified holding lip portion 18a in which the tip end portion 136 including the head portion 19 is connected to the long base end portion 137. Then, on the tip end portion 136, the slope 138 is formed at an inclination angle a with respect to the extension plane 137b of the opening-portion-side surface 137a of the base end portion 137.

On the other hand, when the modified holding lip portion 18c having the shortest section 34 is formed, the first slide core 146 is disposed in a position Pc1 closest to the side-wall-portion opening 144. At the same time, the second slide core 149 is disposed in a position Pc2 not to interfere with the side-wall-portion opening 144 and the head-portion opening 148 of the first slide core 146. At this time, an end surface of the tip-end-portion opening 147 of the first slide core 146 and the end surface of the base-end-portion opening 145 of the first plate 142 are formed to have an angle of 180-γ°. In this condition, unvulcanized EPDM solid rubber is extruded so as to form the modified holding lip portion 18c in which the tip end portion 136 and the base end portion 137 are connected to-the interior side wall portion 15 in the condition that they are substantially coincident with each other. Then, on the tip end portion 136, the slope 38 is formed at an inclination angle γ with respect to the extension plane 137b of the opening-portion-side surface 137a of the base end portion 137.

Further, when the modified holding lip portion 18b of the medium section 33 is formed, the first slide core 146 is disposed in a position Pm1 between the above-mentioned two positions Pf1 and Pc1. At the same time, the second slide core 149 is disposed in a position Pm2 between the above-mentioned two positions Pf2 and Pc2. In this condition, unvulcanized EPDM solid rubber is extruded so as to form the modified holding lip portion 18b in which the tip end portion 136 including the head portion 19 is connected onto the base end portion 137 having a medium length. Then, on the tip end portion 136, the slope 138 is formed at an inclination angle β with respect to the extension plane 137b of the opening-portion-side surface 137a of the base end portion 137.

Next, the weather strip 11 configured thus is attached to the flange 28 according to the same manner for the first embodiment.

Thus, according to this embodiment, the following effects can be obtained.

(i) In this weather strip 11, the slopes 138 inclined with respect to the extension planes 137b of the opening-portion-side surfaces 137a of the base end portions 137 are provided in the tip end portions 136 of the modified holding lip portions 18a to 18c. Then, the slopes 138 are formed so that the inclination angles α, β and γ of the slopes 138 with respect to the extension planes 137b vary in accordance with the projecting lengths of the modified holding lip portions 18a to 18c respectively.

Here, the projecting lengths of the respective modified holding lip portions 18a to 18c have been varied in accordance with the thickness of the flange 28. In consideration of such variation, the inclination angles α, β and γ of the slopes 138 at the tip ends of the modified holding lip portions 18a to 18c with respect to the extension planes 137b are adjusted so that the lapping quantities of the modified holding lip portions 18a to 18c over the flange 28 can be adjusted easily. Then, the lapping quantities are adjusted in accordance with rigidities of the base end portions 137 of the modified holding lip portions 18a to 18c varying in accordance with the projecting lengths. Thus, even if the modified holding lip portions 18a to 18c have different projecting lengths, the insertion load and the pull-out load on the flange 28 can be adjusted to always stay in a predetermined range.

As a result, the insertion load on a thick portion of the flange 28 can be prevented from increasing, with a simple structure and with a reduced amount of EPDM solid rubber used. In the weather strip 11, it is therefore possible to prevent the insertion load on a thick portion of the flange 28 from increasing while it is possible to reduce the manufacturing cost.

(ii) In this weather strip 11, the slopes 138 on the modified holding lip portions 18a to 18c are formed so that the inclination angles α, β and γ increase in accordance with the projecting lengths of the modified holding lip portions 18a to 18c.

Because of such a configuration, in the modified holding lip portion 18c of the shortest section 34 with a small projecting length in which the rigidity of the base end portion 137 is apt to increase, the inclination angle γ of the slope 138 with respect to the extension plane 137b of the opening-portion-side surface 137a of the base end portion 137 becomes small. Here, because the opposite side surfaces of the base end portion 137 are substantially parallel with each other, the modified holding lip portion 18c has an acuter triangular shape at its tip end. Thus, the sectional area of the tip end portion 136 of the modified holding lip portion 18c can be set to be small. In addition, the flexibility of the tip end portion 136 can be increased so that it is possible to prevent the insertion load on the flange 28 from increasing even in the modified holding lip portion 18c of the shortest section 34.

On the other hand, in the modified holding lip portion 18a of the longest section 32 with a large projecting length in which the rigidity of the base end portion 137 is apt to decrease, the inclination angle a of the slope 138 with respect to the extension plane 137b of the opening-portion-side surface 137a of the base end portion 137 becomes large. As a result, the tip end of the modified holding lip portion 18a forms an angle closer to a right angle. Thus, the sectional area of the tip end portion 136 of the modified holding lip portion 18a can be set to be large. In addition, the lapping quantity of the tip end portion 136 over the flange 28 can be increased so that it is possible to prevent the pull-out load at the tip end portion 136 on the flange 28 from being lowered.

Accordingly, not only the increase of the insertion load on a thick portion of the flange 28 in the shortest section 34 but also the lowering of the pull-out load on a thin portion of the flange 28 in the shortest section 34 can be prevented simultaneously in this weather strip 11.

(iii) In this weather strip 11, the modified holding lip portion 18c of the shortest section 34 in the trim body 12 is formed so that the Length Lo of the modified holding lip portion 18c on the opening portion 31 side is not larger than half of the length Li of the modified holding lip portion 18c on the bottom wall portion 17 side as similar to the first embodiment. Accordingly, similarly to the first embodiment, a flexible portion having a sectionally triangular shape which can be elastically deformed along the flange 28 of the vehicle body panel 27 when the trim body 12 is attached to the flange 28 can be established surely on the tip end side of the base end portion 137 in the modified holding lip portion 18c of the shortest section 34.

Thus, because of the presence of the flexible portion, when the trim body 12 is attached to the flange 28, a predetermined lapping quantity is ensured between the modified holding lip portion 18c and the flange 28 while the rigidity is reduced surely and moderately in the modified holding lip portion 18c. Also in the modified holding lip portion 18c of the shortest section 34, it is therefore possible to effectively prevent the insertion load from increasing and the pull-out load from being lowered.

(iv) In this weather strip 11, the head portion 19 bulging out toward the bottom wall portion 17 of the trim body 12 is provided at the tip end of the holding lip 18 as similar to the first embodiment.

As a result, the pull-out load can be increased. Here, since the head portion 19 bulges out toward the bottom wall portion 17 of the trim body 12, the insertion load is hardly increased when the trim body 12 is attached to the flange 28. It is therefore possible to further prevent the pull-out load from being lowered, without increasing the insertion load at the time of attachment.

Incidentally, the above-mentioned embodiment may be modified as follows.

Figure 13:
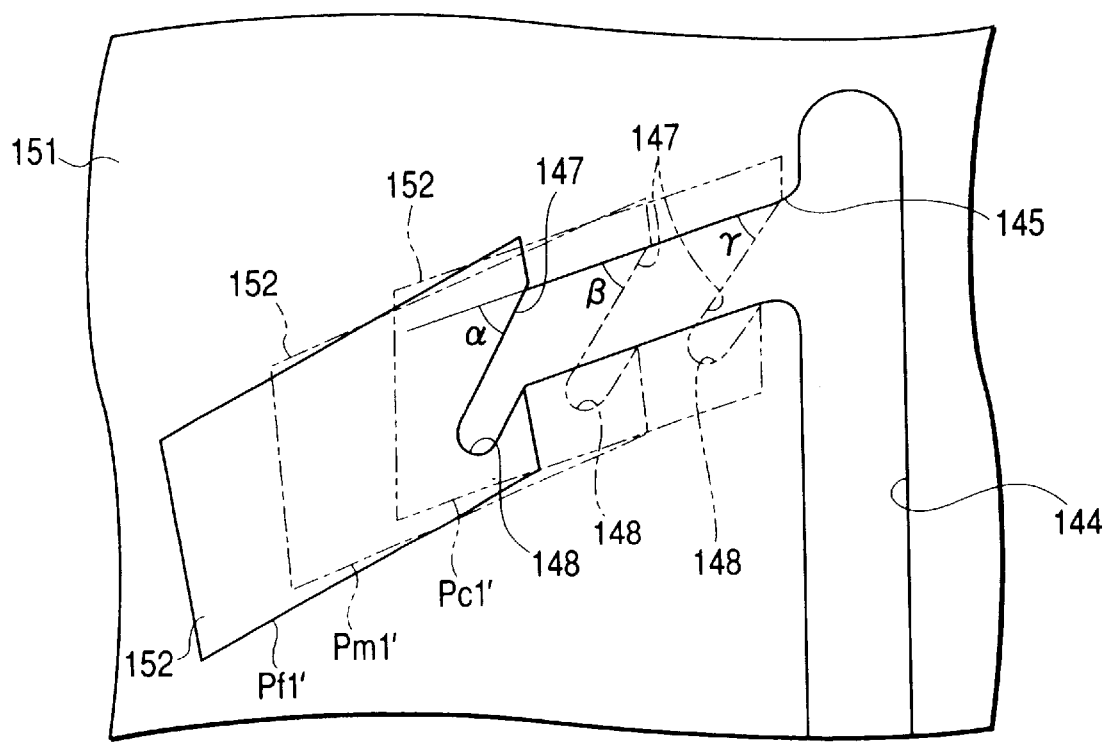
FIG. 13 shows an enlarged partial view of a main portion of a die for extruding the modified holding lip portions for a modified embodiment.

In the above-mentioned embodiment, the respective modified holding lip portions 18a to 18c may be formed by a die 151 shown in FIG. 13 by way of example. That is, in this die 151, a first plate 142, a second plate 143 and a not-shown cover plate are superimposed on one another in the order of increasing distance from a not-shown extruder. In the first plate 142, there are a side-wall-portion opening 144 and a base-end-portion opening 145. On the other hand, in the second plate 143, there is provided a slide core 152 in which a tip-end-portion opening 147 and a head-portion opening 148 are formed. This slide core 152 slides in the extension direction of the holding lip 18 while rotating around the vicinity of the intersection point between an end surface of the base-end-portion opening 145 of the first plate 142 and an end surface of the tip-end-portion opening 147 of the first slide core 152 synchronously with the sliding motion.

Then, when the projecting length of the holding lip 18 is varied, the slide core 152 is slid and rotated to vary the opening area of the base-end-portion opening 145. That is, when the modified holding lip portion 18a of the longest section 32 is formed, the slide core 152 is disposed in a position Pf1' farthest from the side-wall-portion opening 144. At the same time, the slide core 152 is located to be inclined slightly with respect to the base-end-portion opening 145 of the first plate 142 so that an end surface of the tip-end-portion opening 147 of the slide core 152 forms an angle of 180-α° with respect to an end surface of the base-end-portion opening 145 of the first plate 142. In this condition, unvulcanized EPDM solid rubber is extruded to form the modified holding lip portion 18a. Then, on the tip end portion 136, the slope 138 is formed at an inclination angle α with respect to the extension plane 137b of the opening-portion-side surface 137a of the base end portion 137.

On the other hand, when the modified holding lip portion 18c of the shortest section 34 is formed, the slide core 152 is disposed in a position Pc1' closest to the side-wall-portion opening 144. At this time, the slide core 152 is located along the base-end-portion opening 145 of the first plate 142 so that an end surface of the tip-end-portion opening 147 of the slide core 152 forms an angle of 180-γ° with respect to the end surface of the base-end-portion opening 145 of the first plate 142. In this condition, unvulcanized EPDM solid rubber is extruded to form the modified holding lip portion 18c. Then, on the tip end portion 136, the slope 138 is formed at an inclination angle γ with respect to the extension plane 137b of the opening-portion-side surface 137a of the base end portion 137.

Further, when the modified holding lip portion 18b of the medium section 33 is formed, the slide core 152 is disposed in a position Pm1' between the above-mentioned two positions Pf1' and Pc1'. In this condition, unvulcanized EPDM solid rubber is extruded to form the modified holding lip portion 18b. Then, on the tip end portion 136, the slope 138 is formed at an inclination angle β with respect to the extension plane 137b of the opening-portion-side surface 137a of the base end portion 137.

With such a configuration, the number of constituent parts can be reduced in the die 151 for varying the projecting length of the holding lip 18 and for varying the inclination angles α, β and γ of the slope 138. Thus, the structure of the die 151 can be simplified.

Figure 14:
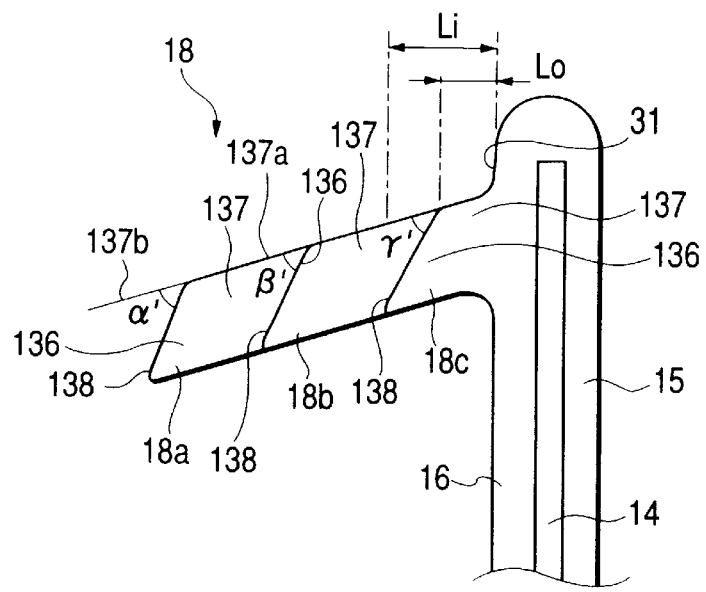
FIG. 14 shows an explanatory view of the modified holding lip portions for a still another modified embodiment.
Figure 15:
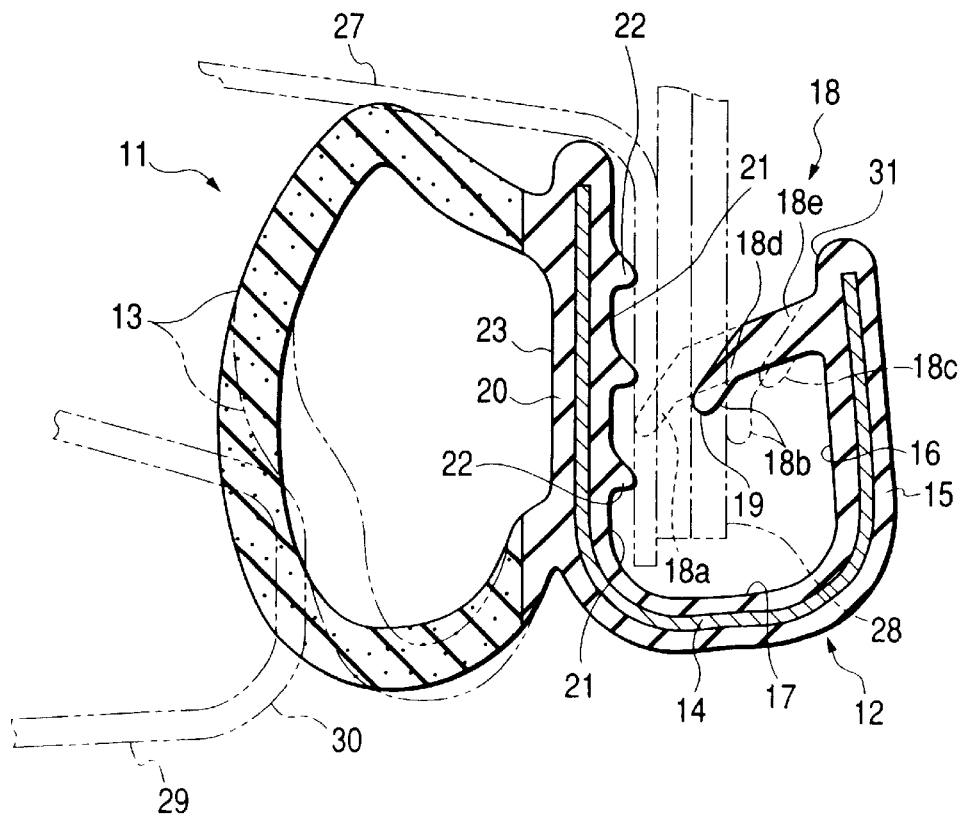
FIG. 15 shows a sectional view taken along line I—I in FIG. 2 in the third embodiment of a weather strip.
Figure 16:
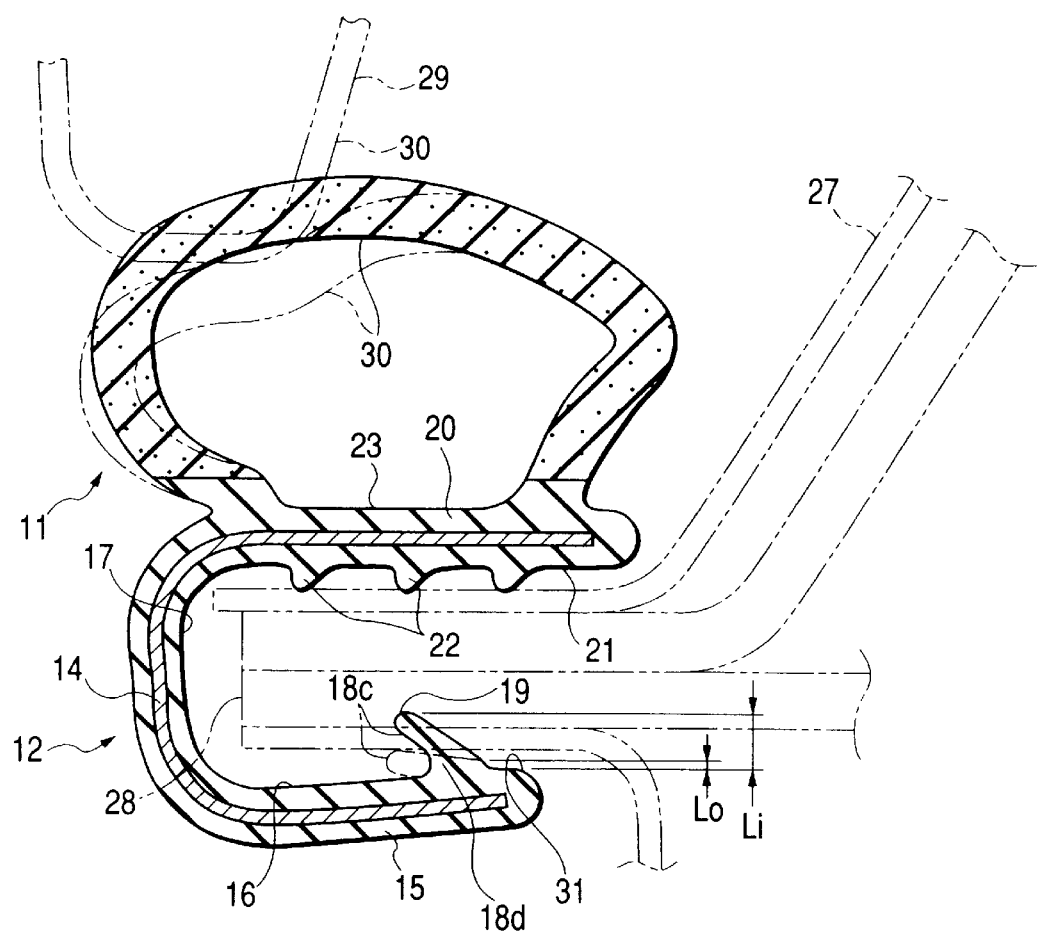
FIG. 16 shows a sectional view taken along line III—III in FIG. 2 in the third embodiment of the weather strip.

As shown in FIG. 14, in the above-mentioned embodiment, the head portion 19 at the tip ends of the modified holding lip portions 18a to 18c may be omitted. In addition, the modified holding lip portion 18c in the shortest section 34 may be formed so that the aforementioned relationship (4) is satisfied in the range of Lo determined by the expression (1) between the length Li of the modified holding lip portion 18c on the bottom wall portion 17 side and the length Lo of the modified holding lip portion 18c on the opening portion 31 side as similar to the modification of the first embodiment.

Here, when the inclination angles of the slope 138 in the modified holding lip portions 18a to 18c with respect to the extension plane 137b of the opening-portion-side surface 137a of the base end portion 137 are α', β' and γ' respectively, the inclination angles α', β' and γ' are set to satisfy the relation of α'>β'>γ'. With such a configuration, the rigidity of the base end portion 137 of the modified holding lip portion 18c in the shortest section 34 is slightly increased, but effect substantially similar to that in the above-mentioned embodiment can be obtained.

Next, description will be made below about a third embodiment for carrying out the present invention with reference to FIGS. 15 to 18. This embodiment has a basic configuration same as the first embodiment except that all head portions 19 has same shapes. Thus, the shape of the head portion 19 is not changed in accordance with the projecting lengths of the modified holding lip portions 18a to 18c.

Especially, in this embodiment, the modified holding lip portion 18c in the shortest section 34 may be formed so that the length Li of the modified holding lip portion 18c on the bottom wall portion 17 side and the length Lo of the modified holding lip portion 18c on the opening portion 31 side satisfy the above (1).

Brief description will be made about the method for manufacturing the weather strip 11, mainly made about the method for manufacturing the vicinity of the holding lip 18 with reference to FIGS. 17 and 18.

A die having an opening for forming the trim body 12 and an opening for forming the seal portion 13 respectively is attached to an extruder. Then, an extruded weather strip member is continuously extruded by the same manner as the manufacturing method in the first and second embodiments. The extruded weather strip member extruded continuously thus is cut off into a predetermined length. Thus, one weather strip 11 is formed out.

Here, in the weather strip 11 of this embodiment, the projecting length of the holding lip 18 is variously varied in the longitudinal direction of the weather strip 11. In a die 238 for varying the projecting length of the holding lip 18, a first plate 240, a second plate 241, a cover plate 242 are superimposed on one another in the order of increasing distance from an extruder 239 as shown in FIGS. 17 and 18. In the first plate 240, there are formed a side-wall-portion opening 243 for forming the opposite side wall portions 15 and 20 of the trim body 12, and a base-end-portion opening 244 for forming the base end portion 18e correspondingly to the modified holding lip portion 18a of the longest section 32, respectively.

On the other hand, in the second plate 241, there is provided a slide core 245 for sliding in the extension direction (indicated by the bidirectional arrow in FIG. 17) of the holding lip 18. In this slide core 245, there are a tip-end-portion opening 246 for forming the tip end portion 18d of the holding lip 18, and a tip-end-protrusion-strip opening 247 for forming the head portion 19. The tip-end-protrusion-strip opening 247 is formed to be enlarged gradually, from the tip-end-portion opening 246, in the direction in which the unvulcanized rubber is extruded from the extruder.

Figure 17:
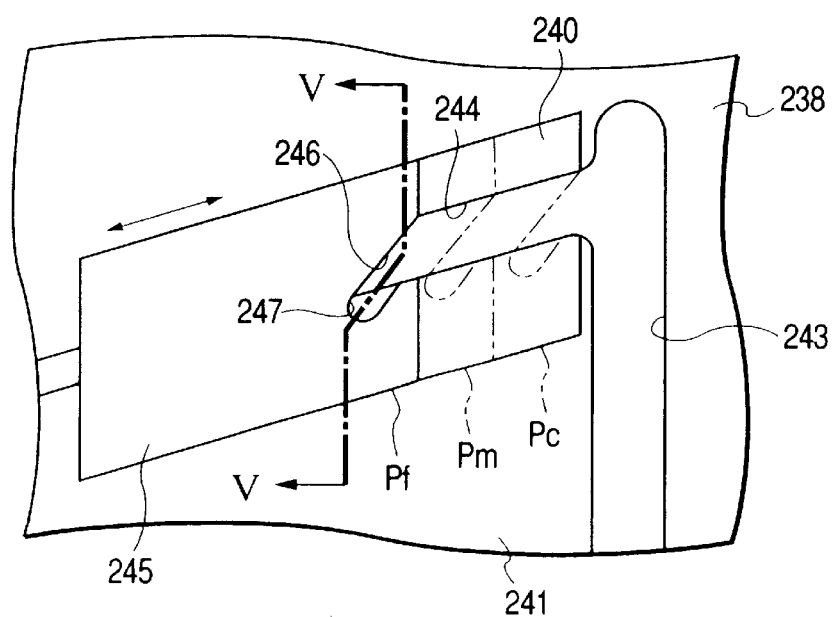
FIG. 17 shows an enlarged partial view of a main portion of a die for extruding the modified holding lip portions shown in FIGS. 15 and 16.
Figure 18:
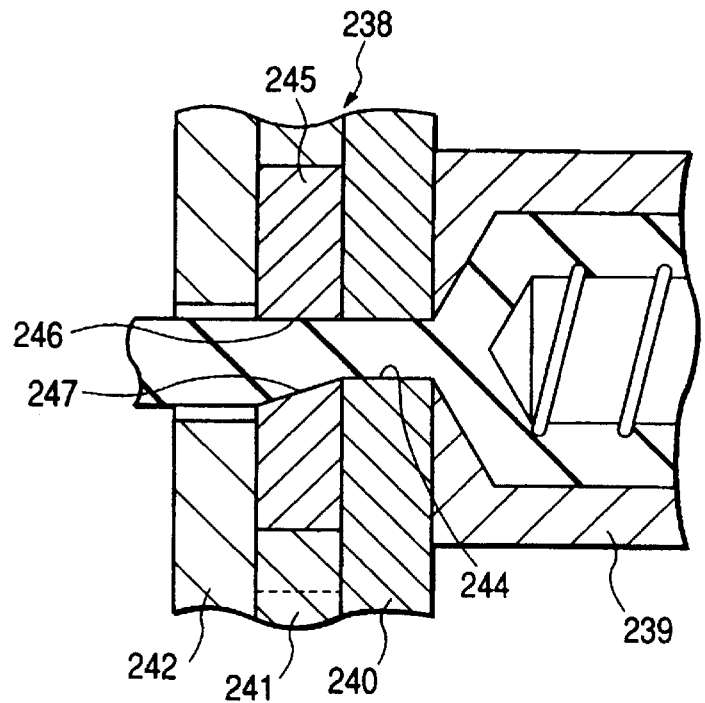
FIG. 18 shows a sectional view taken along line V—V in FIG. 17.
Figure 19:
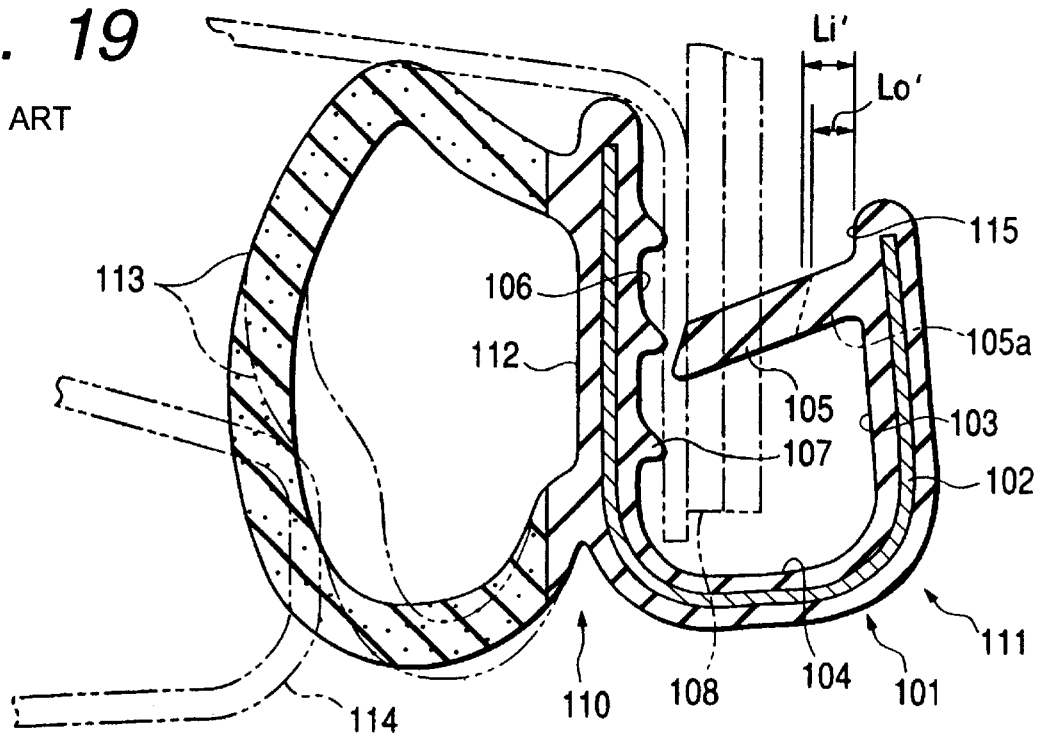
FIG. 19 shows a sectional view of a conventional weather strip.
Figure 20:
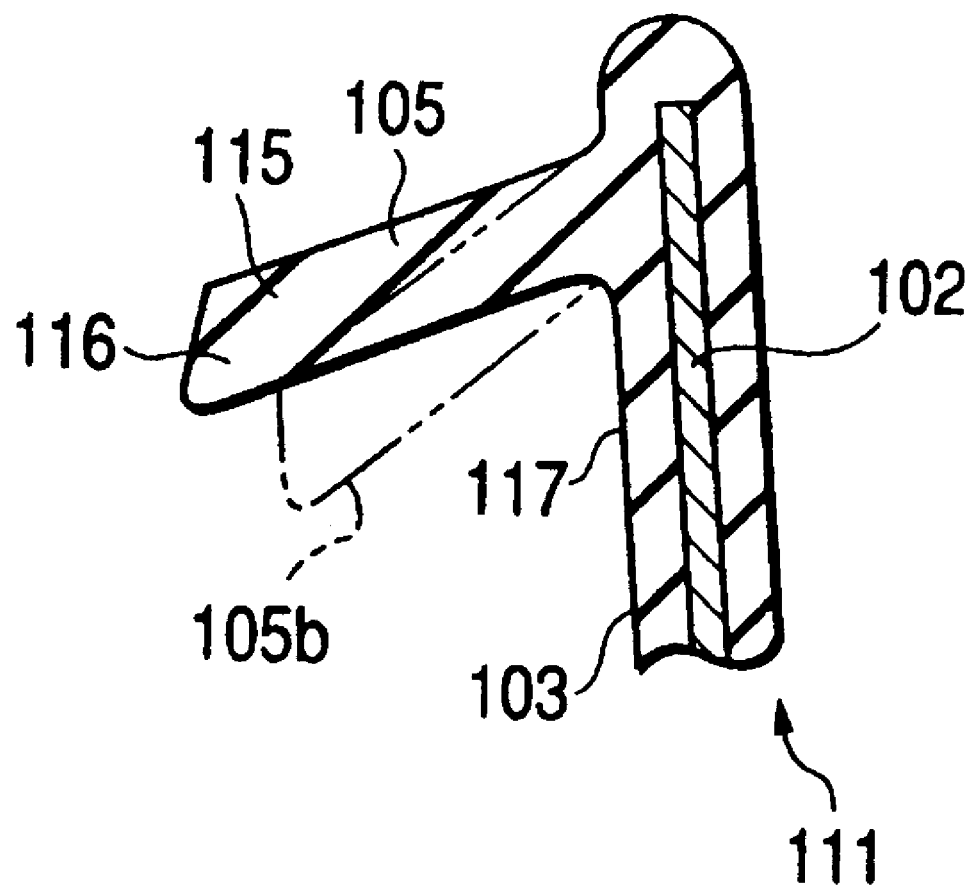
FIG. 20 shows a partial sectional view showing a main portion of a conventional weather strip.

Then, when the projecting length of the holding lip 18 is varied, the slide core 245 is slid in the bidirectional-arrow direction of FIG. 17 so as to vary the opening area of the base-end-portion opening 244. That is, when the modified holding lip portion 18a of the longest section 32 is to be formed, the slide core 245 is disposed in a position Pf farthest from the side-wall-portion opening 243. Thus, the modified holding lip portion 18a is formed so that the tip end portion 18d including the head portion 19 is connected onto the long base end portion 18e.

On the other hand, when the modified holding lip portion 18c of the shortest section 34 is to be formed, the slide core 245 is disposed in a position Pc closest to the side-wallportion opening 243. Thus, the modified holding lip portion 18c is formed so that the tip end portion 18d is connected to the interior side wall portion 15 directly without interposition of the base end portion 18e.

Further, when the modified holding lip portion 18b of the medium section 33 is to be formed, the slide core 245 is disposed in a position Pm between the above-mentioned two positions Pf and Pc. Thus, the modified holding lip portion 18b is formed so that the tip end portion 18d including the head portion 19 is connected onto the base end portion 18e having the medium length.

Incidentally, the extruder 239 in this embodiment is provided with a mechanism for suppressing the fluctuation of extrusion pressure, such as a known accumulator or the like (not shown). Accordingly, the fluctuation of pressure is restrained from occurring in the die 238 and the extruder 239 as the slide core 245 moves. As a result, the shape of the extruded unvulcanized weather strip member extruded from the die 238 is stabilized.

Thus, according to this embodiment, the following effects can be obtained.

(i) In this weather strip 11, as similar to the above embodiments, the modified holding lip portion 18c in the shortest section 34 in the trim body 12 is formed so that the length Lo of the modified holding lip portion 18c on the opening portion 31 side is not larger than half of the length Li of the modified holding lip portion 18c on the bottom wall portion 17 side.

Accordingly, the weather strip 11 can be held on the flange 28 more surely, regardless of the thickness of the flange 28. In addition, the attachment property of the trim body 12 to the flange 28 can be improved.

(ii) In this weather strip 11, the modified holding lip portion 18c in the shortest section 34 is formed into a substantially triangular shape in section. That is, in the modified holding lip portion 18c in the shortest section 34, the length Lo of the modified holding lip portion 18c on the opening portion 31 side is set to be approximately zero.

Accordingly, the modified holding lip portion 18c in the shortest section 34 as a whole becomes a flexible portion having a good flexibility. As a result, when the trim body 12 is attached to the flange 28, the insertion load at the trim body 12 can be more easily prevented from exceeding a predetermined value. It is therefore possible to further improve the attachment property of the trim body 12 to the flange 28.

(iii) In this weather strip 11, the insert member 14 for reinforcing the trim body 12 is embedded in the trim body 12. In such a trim body 12 provided with the insert member embedded therein, the rigidity is increased in the opposite side wall portions 15 and 20 of the trim body 12. Accordingly, the insertion load when the trim body 12 is attached to the flange 28 is apt to increase. In this weather strip 11, however, the flexibility of the shortest section 34 is increased so that such increase of the insertion load can be suppressed effectively.

(iv) In this weather strip 11, the head portion 19 bulging out toward the bottom wall portion 17 of the trim body 12 is provided at the tip end of the holding lip 18. Accordingly, the insertion load is hardly increased when the trim body 12 is attached to the flange 28, and the pull-out load can be increased without increasing the insertion load at the time of attachment.

Incidentally, the above-mentioned embodiment may be modified as follows.

In the above-mentioned embodiment, the head portion 19 may be omitted. With such a configuration, the structure of the die 238 for forming the holding lip 18 can be simplified.

In the above-mentioned embodiment, the weather strip 11 may be formed with an extruder 239 which is not provided with a mechanism for suppressing the fluctuation of extrusion pressure, such as an accumulator or the like. In this case, there is a possibility that the shape of the tip end portion 18d of the holding lip 18 is changed slightly due to the fluctuation of pressure produced in the die 238 and the extruder 239 as the slide core 245 moves. Nevertheless, it is possible to ensure effects similar to those in the above-mentioned embodiment.

In the above all embodiments, the present invention was carried out in the weather strip 11 in which the holding lip 18 was provided to project only on the inner surface 16 of the interior side wall portion 15. Otherwise, the present invention may be carried out in a weather strip 11 in which a holding lip 18 is provided to project on an inner surface 21 of the exterior side wall portion 20, or in a weather strip 11 in which holding lips 18 are provided on the inner surfaces 16 and 21 of the opposite interior and exterior side wall portions 15 and 20 respectively so that the holding lips 18 face each other. Alternatively, the present invention may be carried out in a weather strip 11 in which a plurality of holding lips 18 are provided on one of the side wall portions 15 and 20.

In the above all embodiments, the holding protrusions 22 may be omitted.

In the above all embodiments, the trim body 12 may be composed of, for example, thermoplastic elastomer, soft resin such as polyvinyl chloride, or the like. In addition, the insert member 14 may be omitted in the trim body 12.

The present invention was carried out in the weather strip 11 to be attached to the flange 28 of the side-door opening portion 26 of a vehicle in the above all embodiments. Otherwise, the present invention may be carried out in a weather strip to be attached to a flange at the circumferential edge of an opening portion of a vehicle, for example, a back door, a trunk, a sun roof, a bonnet, or the like. Alternatively, the present invention may be carried out in a trim for covering a flange of a vehicle body or the like so as to improve, for example, decorative properties.

Also in these cases, effects substantially similar to those in the above all embodiments can be obtained.

As described above in detail, according to the first aspect of the invention, it is possible to conspicuously prevent the lowering of a pull-out load at a lip portion having a small projecting length without increasing an insertion load at the time of attachment. Thus, it is not necessary to form a lip portion in the shortest section so accurately, and it is possible to reduce the manufacturing cost.

In addition, the above effects according to the first aspect can be obtained in a simple configuration.

In addition, it is possible to reduce the rigidity in a base end portion of the modified lip portion in the shortest section moderately. It is therefore possible to prevent the increase of the insertion load and the lowering of the pull-out load effectively when a trim body is attached to a subject.

In addition, the above effects according to the first aspect can be obtained in a seal member attached to a vehicle for sealing off the interior and exterior sides of the cabin of the vehicle or the like. For example, the pull-out load can be prevented from being lowered without increasing the insertion load when the trim portion is to be attached.

Still further, according to the second aspect of the invention, the insertion load at a lip portion in a shortest section is prevented from exceeding a predetermined value. Thus, the attachment property of a trim to a subject to which the trim is attached can be improved.

In addition to the above effect according to the second aspect, the attachment property of the trim to the subject can be further improved.

In addition, in a trim having an insert member which is rich in rigidity, the work of insertion is facilitated and, particularly, the above effect according to the second aspect is exhibited conspicuously.

In addition to the above effect according to the second aspect, it is possible to make the trim to be attached easily to the subject and to make the trim difficult to be detached from the subject.

In addition, the effects according to the second aspect can be obtained in a seal member attached to a vehicle for sealing off the interior and exterior sides of the cabin of the vehicle or the like. For example, the insertion load when a trim portion is to be attached to the subject can be prevented from exceeding a predetermined value.

Further, according to the third aspect of the invention, not only is it possible to prevent the increase of an insertion load on a thick portion of a subject to which a trim is attached, but also it is possible to reduce the manufacturing cost of the trim.

In addition to the above effect according to the third aspect, it is possible to prevent not only the increase of the insertion load on the thick portion of the subject but also the lowering of a pull-out load on a thin portion of the subject.

In addition to the above effect according to the third aspect, it is possible to effectively prevent the insertion load from increasing and the pull-out load from being lowered in a lip of a shortest section.

In addition to the above effect according to the third aspect, it is possible to further prevent the pull-out load from being lowered, without increasing the insertion load at the time of attachment.

The effects according to the third aspect can be attained in a seal member attached to a vehicle for sealing off the interior and exterior sides of the cabin of the vehicle or the like. For example, prevention of the insertion load at the trim portion from increasing when the trim portion is attached to a thick subject.

Although the invention has been described in its preferred form with a certain degree of particularity, it is understood that the present disclosure of the preferred form can be changed in the details of construction and in the combination and arrangement of parts without departing from the spirit and the scope of the invention as hereinafter claimed.

What is claimed is:

1. A trim comprising: a trim body formed of a polymeric material, wherein the trim body extends in a longitudinal direction, and the trim body has a substantially U-shaped cross section;
    an insert member embedded in said trim body and reinforcing said trim body;
    a lip provided to project from an inner surface of said trim body, wherein a projecting length, which is the distance by which said lip projects from said inner surface, varies in the longitudinal direction of said trim body,
    wherein said lip is formed so that the following relationship is satisfied between a length Li of said lip on a bottom wall portion side of said trim body and a length Lo of said lip on an opening portion side of said trim body in a shortest section in which said projecting length of said lip becomes shortest: $0 \leq Lo \leq Li/2$; and
    a head portion being provided at a tip end of said lip so as to bulge towards a bottom wall portion side of said trim body.

2. A trim according to claim 1, wherein said lip is formed so that a sectional shape of said lip in said shortest section is substantially triangular.

3. A trim according to claim 1, wherein a sectional area of said head portion varies in accordance with said projecting length of said lip.

4. A trim according to claim 1, wherein said head portion is formed so that there is an inverse relationship between the sectional area of the head portion and the projecting length, such that a larger sectional area of the head portion corresponds to a smaller projecting distance, and a smaller sectional area of the head portion corresponds to a larger projecting length.

5. A trim according to claim 4, wherein said head portion is formed so that at least one dimension of said head portion is larger when the projecting length is smaller.

6. A trim according to claim 1, further comprising a slope being provided at a tip end of said lip so as to be inclined with respect to an extension plane of an opening-portion-side surface in a base end portion of said lip, and said slope is formed so that an inclination angle of said slope with respect to said extension plane of said opening-portion-side surface varies in accordance with said projecting length of said lip.

7. A trim according to claim 6, wherein said slope is formed so that said inclination angle increases in accordance with said projecting length of said lip.

8. A trim comprising:
    a trim body formed of a polymeric material, wherein the trim body extends in a longitudinal direction, and the trim body has a substantially U-shaped cross section;
    an insert member embedded in said trim body and reinforcing said trim body;
    a lip provided to project from an inner surface of said trim body, wherein a projecting length, which is the distance by which said lip projects from said inner surfaces varies in the longitudinal direction of said trim body;
    a head portion bulging toward a bottom wall portion of said trim body formed at a tip end of said lip, wherein the sectional area of said head portion varies according to the projecting length, and there is an inverse relationship between the sectional area and the projecting length, such that a larger sectional area of the head portion corresponds to a smaller projecting distance, and a smaller sectional area of the head portion corresponds to a larger projecting length.

9. A trim according to claim 8, wherein said head portion is formed so that at least one dimension of said head portion is larger when the projecting length is smaller.

10. A seal member comprising:
    a trim body formed of a polymeric material, wherein the trim body extends in a longitudinal direction, and the trim body has a substantially U-shaped cross section;
    an insert member embedded in said trim body and reinforcing said trim body;
    a lip provided to project from an inner surface of said trim body, wherein a projecting length, which is the distance by which said lip projects from said inner surface, varies in the longitudinal direction of said trim body; and
    a head portion being provided at a tip end of said lip, wherein the head portion bulges towards a bottom wall portion of said trim body,
    wherein a slope is provided at a tip end of said lip so as to be inclined with respect to an extension plane of an opening-portion-side surface in a base end portion of said lip, and said slope is formed so that an inclination angle of said slope with respect to said extension plane of said opening-portion-side surface varies in accordance with said projecting length of said lip.

11. A trim according to claim 10, wherein said slope is formed so that said inclination angle increases in accordance with said projecting length of said lip.

12. A seal member comprising:
(A) a trim portion attachable on an edge of an opening portion of a body of a vehicle corresponding to an opening and closing body of said vehicle, said trim portion comprising:
   a trim body formed of a polymeric material, wherein the trim body extends in a longitudinal direction, and the trim body has a substantially U-shaped cross section;
   an insert member embedded in said trim body and reinforcing said trim body;
   a lip provided to project from an inner surface of said trim body, wherein a projecting length, which is the distance by which said lip projects from said inner surface, varies in the longitudinal direction of said trim body; and
   a head portion being provided at a tip end of said lip, wherein the head portion bulges towards a bottom wall portion side of said trim body,
   wherein said lip is formed so that the following relationship is satisfied between a length Li of said lip on a bottom wall portion side of said trim body and a length Lo of said lip on an opening portion side of said trim body in a section of said lip in which said projecting length of said lip is the shortest: $0 \leq Lo \leq Li/2$; and
(B) a seal portion which is attached to said trim portion and can be elastically deformed by pressure contact against said opening and closing body.

13. A seal member comprising:
(A) a trim portion attachable to a flange portion of an opening of a body of a vehicle corresponding to an opening and closing door of said vehicle, said trim portion comprising:
   a trim body formed of a polymeric material, wherein the trim body extends in a longitudinal direction, and the trim body has a substantially section;
   an insert member embedded in said trim body and reinforcing said trim body;
   a lip provided to project from an inner surface of said trim body, wherein a projecting length, which is the distance by which said lip projects from said inner surface, varies in the longitudinal direction of said trim body; and
   a head portion bulging toward a bottom wall portion of said trim body formed at a tip end of said lip, wherein the sectional area of said head portion varies, according to the projecting length: and
(B) a seal portion, which is attached to said trim portion and can be elastically deformed by pressure contact against said opening and closing door.

14. A seal member comprising:
(A) a trim portion attachable on a flange portion of an opening portion of a body of a vehicle corresponding to an opening and closing door of said vehicle, said trim portion comprising:
   a trim body formed of a polymeric material, wherein the trim body extends in a longitudinal direction, and the trim body has a substantially U-shaped cross section;
   an insert member embedded in said trim body and reinforcing said trim body;
   a lip provided to project from an inner surface of said trim body, wherein a projecting length, which is the distance by which said lip projects from said inner surface, varies in the longitudinal direction of said trim body; and
   a head portion being provided at a tip end of said lip, wherein the head portion bulges towards a bottom wall portion side of said trim body,
   wherein a slope is provided at a tip end of said lip so as to be inclined with respect to an extension plane of an opening-portion-side surface in a base end portion of said lip, and said slope is formed so that an inclination angle of said slope with respect to said extension plane of said opening-portion-side surface varies in accordance with said projecting length of said lip; and
(B) a seal portion which is attached to said trim portion and can be elastically deformed by pressure contact against said opening and closing door.

* * * * *